United States Patent
Chung et al.

(10) Patent No.: US 8,848,597 B2
(45) Date of Patent: Sep. 30, 2014

(54) CHANNEL STATUS INFORMATION FEEDBACK METHOD AND APPARATUS IN WIRELESS COMMUNICATION SYSTEM WITH RELAY STATION

(75) Inventors: Jae Hoon Chung, Anyang-si (KR); Kyu Jin Park, Anyang-si (KR); Sung Ho Moon, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 13/392,476

(22) PCT Filed: Sep. 7, 2010

(86) PCT No.: PCT/KR2010/006070
§ 371 (c)(1),
(2), (4) Date: Feb. 24, 2012

(87) PCT Pub. No.: WO2011/028078
PCT Pub. Date: Mar. 10, 2011

(65) Prior Publication Data
US 2012/0147794 A1   Jun. 14, 2012

Related U.S. Application Data

(60) Provisional application No. 61/240,292, filed on Sep. 7, 2009.

(51) Int. Cl.
H04W 72/04  (2009.01)
H04W 24/10  (2009.01)
H04W 84/04  (2009.01)

(52) U.S. Cl.
CPC .......... H04W 72/0406 (2013.01); H04W 24/10 (2013.01); H04W 84/047 (2013.01)
USPC .......................................... 370/315; 370/329

(58) Field of Classification Search
None
See application file for complete search history.

(56) References Cited

U.S. PATENT DOCUMENTS

| | | | |
|---|---|---|---|
| 2008/0049678 A1* | 2/2008 | Chindapol et al. | 370/331 |
| 2008/0166975 A1* | 7/2008 | Kim et al. | 455/68 |
| 2008/0227461 A1* | 9/2008 | Dayal et al. | 455/452.2 |
| 2008/0267113 A1* | 10/2008 | Lim et al. | 370/315 |
| 2010/0080166 A1* | 4/2010 | Palanki et al. | 370/315 |
| 2010/0254301 A1* | 10/2010 | Blankenship et al. | 370/315 |
| 2012/0002568 A1* | 1/2012 | Tiirola et al. | 370/252 |

FOREIGN PATENT DOCUMENTS

| | | |
|---|---|---|
| KR | 1020070001417 | 1/2007 |
| KR | 1020080069753 | 7/2008 |
| KR | 1020090012519 | 2/2009 |

\* cited by examiner

*Primary Examiner* — Chirag Shah
*Assistant Examiner* — Rina Pancholi
(74) *Attorney, Agent, or Firm* — Lee, Hong, Degerman, Kang & Waimey

(57) ABSTRACT

The present invention relates to a wireless communication system, and more particularly, to a channel status information feedback method and apparatus in a wireless communication system with a relay station. The method for transmitting channel status information according to one embodiment of the present invention comprises: receiving a backhaul downlink signal from a base station; generating channel status information based on the backhaul downlink signal; and transmitting the channel status information via a backhaul uplink subframe, wherein the backhaul uplink subframe to which the channel status information is transmitted can be determined based on a subframe index without a designated backhaul downlink subframe and a backhaul uplink transmission timing relation.

12 Claims, 16 Drawing Sheets

(a)

(b)

CHANNEL STATUS INFORMATION FEEDBACK METHOD AND APPARATUS IN WIRELESS COMMUNICATION SYSTEM WITH RELAY STATION

CROSS-REFERENCE TO RELATED APPLICATIONS

This application is the National Stage filing under 35 U.S.C. 371 of International Application No. PCT/KR2010/006070, filed on Sep. 7, 2010, which claims the benefit of U.S. Provisional Application Ser. No. 61/240,292, filed on Sep. 7, 2009, the contents of which are all incorporated by reference herein in their entirety.

FIELD OF THE INVENTION

The present invention relates to a wireless communication system and, more particularly, to a channel status information feedback method and an apparatus in a wireless communication system with a relay station.

BACKGROUND ART

FIG. 1 illustrates a Relay Node (RN, 120) and User Equipments (UEs, 131 and 132) existing in a base station (eNodeB; EnB, 110) area within a wireless communication system (100). The relay node (120) may deliver data received from the base station (110) to the user equipment (132) existing in the relay node zone (or relay node area), and the relay node (120) may deliver data received from the user equipment (132) existing in the relay node area to the base station (110). Additionally, the relay node (120) may also expand a high-speed data rate region, enhance communication quality at an edge of a cell, and provide communication in areas exceeding in-door areas (areas inside buildings) or base station service areas. Referring to FIG. 1, the base station (110) area includes a user equipment (hereinafter referred to as a Macro-User Equipment (Macro-UE)) directly receiving services from the base station, such as user equipment (131), and a user equipment (hereinafter referred to as a Relay-User Equipment (Relay-UE)) receiving services from the relay node (120), such as user equipment (132).

A wireless link (or radio link) between the base station and the relay node is referred to as a Backhaul Link. Herein, a link from the base station to the relay node is referred to as a Backhaul downlink, and a link from the relay node to the base station is referred to as a Backhaul uplink. Also, a wireless link between the relay node and the user equipment is referred to as an Access Link. Herein, a link from the relay node to the user equipment is referred to as an Access downlink, and a link from the user equipment to the relay node is referred to as an Access uplink.

Meanwhile, in order to support correct downlink transport (or transmission), a receiving end of a downlink channel is required to feed back status information of the downlink channel to a downlink transmitting end. Similarly, in a wireless communication system including a relay node, the relay node may be required to feed back channel status information on a Backhaul downlink channel received from the base station. Furthermore, the user equipments included in a relay node coverage area may also be required to feed back channel status information on an Access downlink channel.

DETAILED DESCRIPTION OF THE INVENTION

Technical Objects

In a wireless communication system including a relay node, limitation may occur in uplink resource assignment (or allocation). For example, in order to support operations of the relay node, assignment of transport (or transmission) subframes may be limited in a Backhaul uplink. A technical object of the present invention is to provide a method for correctly perform channel status information feedback in a situation where the uplink resource assignment is limited.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an embodiment of the present invention, a method for transmitting channel status information at a relay node includes the steps of receiving a Backhaul downlink signal from a base station; generating channel status information based upon the Backhaul downlink signal; and transmitting the channel status information through a Backhaul uplink subframe. And, herein, the Backhaul uplink subframe through which the channel status information is transmitted is decided based upon a subframe index to which a Backhaul downlink subframe is not designated and a Backhaul uplink transmission timing relation.

Also, the Backhaul uplink transmission timing relation corresponds to a timing relation between a Backhaul uplink grant and a Backhaul uplink data transmission.

At this point, the Backhaul uplink subframe through which the channel status information is transmitted corresponds to one of subframe indexes #0, #1, #2, #5, #6, and #7 when FDD (Frequency Division Duplex) is applied, and corresponds to one of subframe indexes #1, #2, #3, #6, #7, and #8 when TDD (Time Division Duplex) is applied.

Also, the Backhaul uplink transmission timing relation corresponds to a timing relation between a Backhaul uplink data transmission and a Backhaul downlink acknowledgement response.

At this point, the Backhaul uplink subframe through which the channel status information is transmitted corresponds to one of subframe indexes #2, #3, #4, #7, #8, and #9 when FDD is applied, and corresponds to one of subframe indexes #0, #3, #4, #5, #8, and #9 when TDD is applied.

Also, the subframe index to which the Backhaul downlink subframe is not designated corresponds to at least one of subframe indexes #0, #4, #5, and #9 when FDD is applied, and corresponds to at least one of subframe indexes #0, #1, #5, and #6 when TDD is applied.

Also, the Backhaul uplink transmission timing relation includes a timing relation between a Backhaul uplink grant and a Backhaul uplink data transmission and a timing relation between a Backhaul uplink data transmission and a Backhaul downlink acknowledgement response. And, herein the Backhaul uplink subframe through which the channel status information is transmitted corresponds to one of subframe indexes #2 and #7 when FDD is applied, and corresponds to one of subframe indexes #3 and #8 when TDD is applied.

Also, the Backhaul uplink subframe through which the channel status information is transmitted is set up as a starting point of a periodic transmission of the channel status information.

Also, information on the Backhaul uplink subframe through which the channel status information is transmitted and information on a cycle period of the channel status information transmission are notified through higher-layer signaling or L1/L2 control signaling from the base station.

In order to achieve the object of the present invention, according to another embodiment of the present invention, a method of for transmitting channel status information at a user equipment includes the steps of receiving an Access downlink signal from a relay node; generating channel status information based upon the Access downlink signal; and transmitting the channel status information through an Access uplink subframe. And, herein, the Access uplink subframe through which the channel status information is transmitted is decided based upon a subframe index to which a Backhaul downlink subframe is not designated and a Backhaul uplink transmission timing relation.

Also, the Backhaul uplink transmission timing relation corresponds to a timing relation between a Backhaul uplink grant and a Backhaul uplink data transmission.

At this point, the Access uplink subframe through which the channel status information is transmitted corresponds to one of subframe indexes #3, #4, #8, and #9 when FDD (Frequency Division Duplex) is applied, and corresponds to one of subframe indexes #0, #4, #5, and #9 when TDD (Time Division Duplex) is applied.

Also, the Backhaul uplink transmission timing relation corresponds to a timing relation between a Backhaul uplink data transmission and a Backhaul downlink acknowledgement response.

At this point, the Access uplink subframe through which the channel status information is transmitted corresponds to one of subframe indexes #0, #1, #5, and #6 when FDD is applied, and corresponds to one of subframe indexes #1, #2, #6, and #7 when TDD is applied.

Also, the subframe index to which the Backhaul downlink subframe is not designated corresponds to one of subframe indexes #0, #4, #5, and #9 when FDD is applied, and corresponds to one of subframe indexes #0, #1, #5, and #6 when TDD is applied.

Also, the Backhaul uplink transmission timing relation includes a timing relation between a Backhaul uplink grant and a Backhaul uplink data transmission and a timing relation between a Backhaul uplink data transmission and a Backhaul downlink acknowledgement response. And, herein, the Access uplink subframe through which the channel status information is transmitted corresponds to one of subframe indexes #0, #1, #3, #4, #5, #6, #8, and #9 when FDD is applied, and corresponds to one of subframe indexes #0, #1, #2, #4, #5, #6, #7, and #9 when TDD is applied.

Also, the Access uplink subframe through which the channel status information is transmitted is set up as a starting point of a periodic transmission of the channel status information.

Also, information on the Access uplink subframe through which the channel status information is transmitted and information on a cycle period of the channel status information transmission are notified through higher-layer signaling or L1/L2 control signaling from the relay node.

In order to achieve the object of the present invention, according to yet another embodiment of the present invention, a relay node for transmitting channel status information includes a receiving module configured to receive a Backhaul downlink signal from a base station and to receive an Access uplink signal from a user equipment; a transmitting module configured to transmit a Backhaul uplink signal to the base station and to transmit an Access downlink signal to the user equipment; and a processor configured to control the receiving module and the transmitting module. And, herein, the processor is configured to generate channel status information based upon the Backhaul downlink signal received through the receiving module, and to transmit the channel status information through a Backhaul uplink subframe through the transmitting module. And, herein, a Backhaul uplink subframe through which the channel status information is transmitted is decided based upon a timing relation between a subframe index to which a Backhaul downlink subframe is not designated and Backhaul uplink transmission.

In order to achieve the object of the present invention, according to a further embodiment of the present invention, a user equipment for transmitting channel status information includes a receiving module configured to receive an Access downlink signal from a relay node; a transmitting module configured to transmit an Access uplink signal to the relay node; and a processor configured to control the receiving module and the transmitting module. And, herein, the processor is configured to generate channel status information based upon the Access downlink signal received through the receiving module, and to transmit the channel status information through an Access uplink subframe through the transmitting module. And, herein, an Access uplink subframe through which the channel status information is transmitted is decided based upon a timing relation between a subframe index to which a Backhaul downlink subframe is not designated and Backhaul uplink transmission.

The above-described general description of the present invention and the detailed description that will follow are merely exemplary and are, therefore, given to provide additional description of the appended claims of the present invention.

Effects of the Invention

According to the exemplary embodiments of the present invention, although there may exist limitation in assigning uplink resources, a downlink receiving end may correctly feed-back channel status information, and the receiving end may use the channel status information feedback so as to be capable of correctly performing downlink transmission.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

BEST MODE FOR CARRYING OUT THE PRESENT INVENTION

Figure 1:
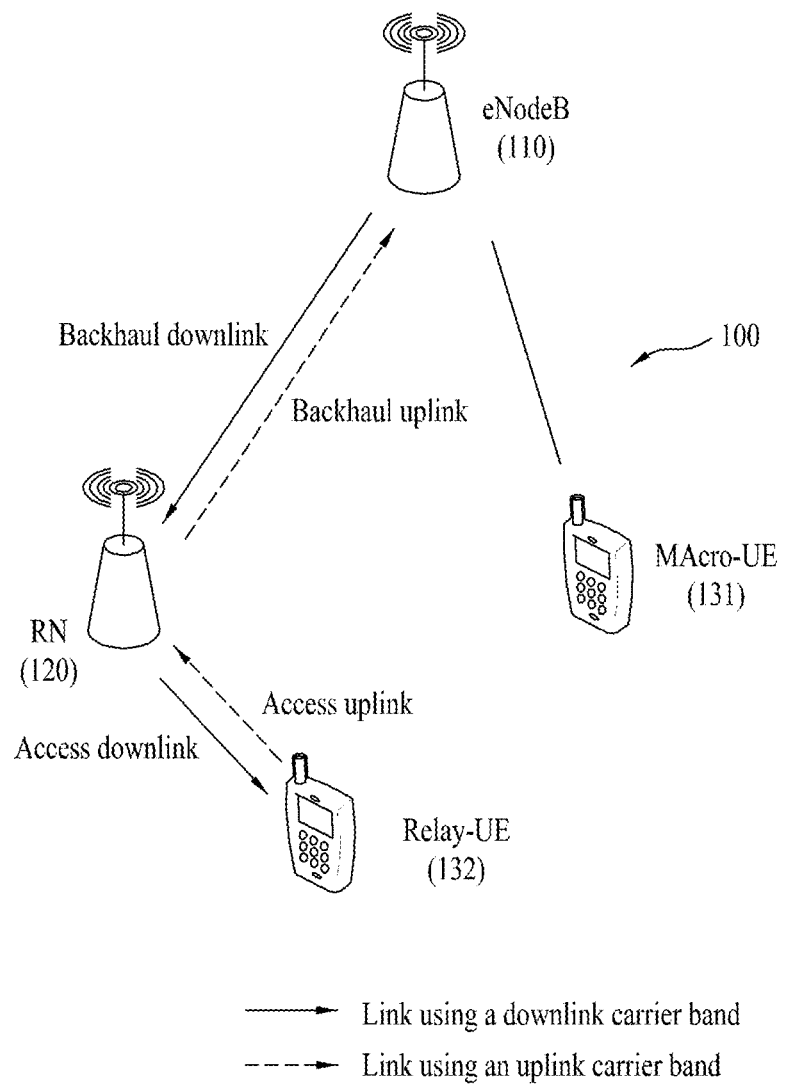
FIG. 1 illustrates a wireless communication system including a base station, a relay node, and user equipments.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

Figure 2:
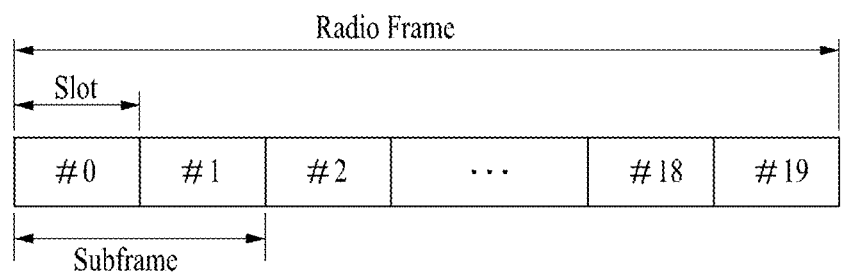
FIG. 2 illustrates an exemplary structure of a radio frame being used in a 3GPP LTE system.

FIG. 2 illustrates a structure of a radio frame being used in a 3GPP LTE system. Herein, one radio frame includes 10 subframes, and each subframe includes 2 slots in a time domain. The time consumed (or taken) for transmitting one subframe may be defined by a Transmission Time Interval (TTI). And, for example, one subframe may have the length of 1 ms, and one slot may have the length of 0.5 ms. In the time domain, one slot may include a plurality of OFDM symbols in a time domain. Since the 3GPP LTE system uses the OFDMA scheme in a downlink transmission, the OFDM symbol may indicate one symbol period. In an uplink transmission, one symbol may also be referred to as an SC-FDMA symbol or a symbol period. A Resource Block (RB) corresponds to a resource allocation unit, and one Resource Block may include a plurality of consecutive subcarriers in one slot. Herein, the above-described structure is merely exemplary. And, therefore, the number of subframes included in one radio frame, the number of slots included in a subframe, or the number of OFDM symbols included in one slot may be varied by using diverse methods.

Figure 3:
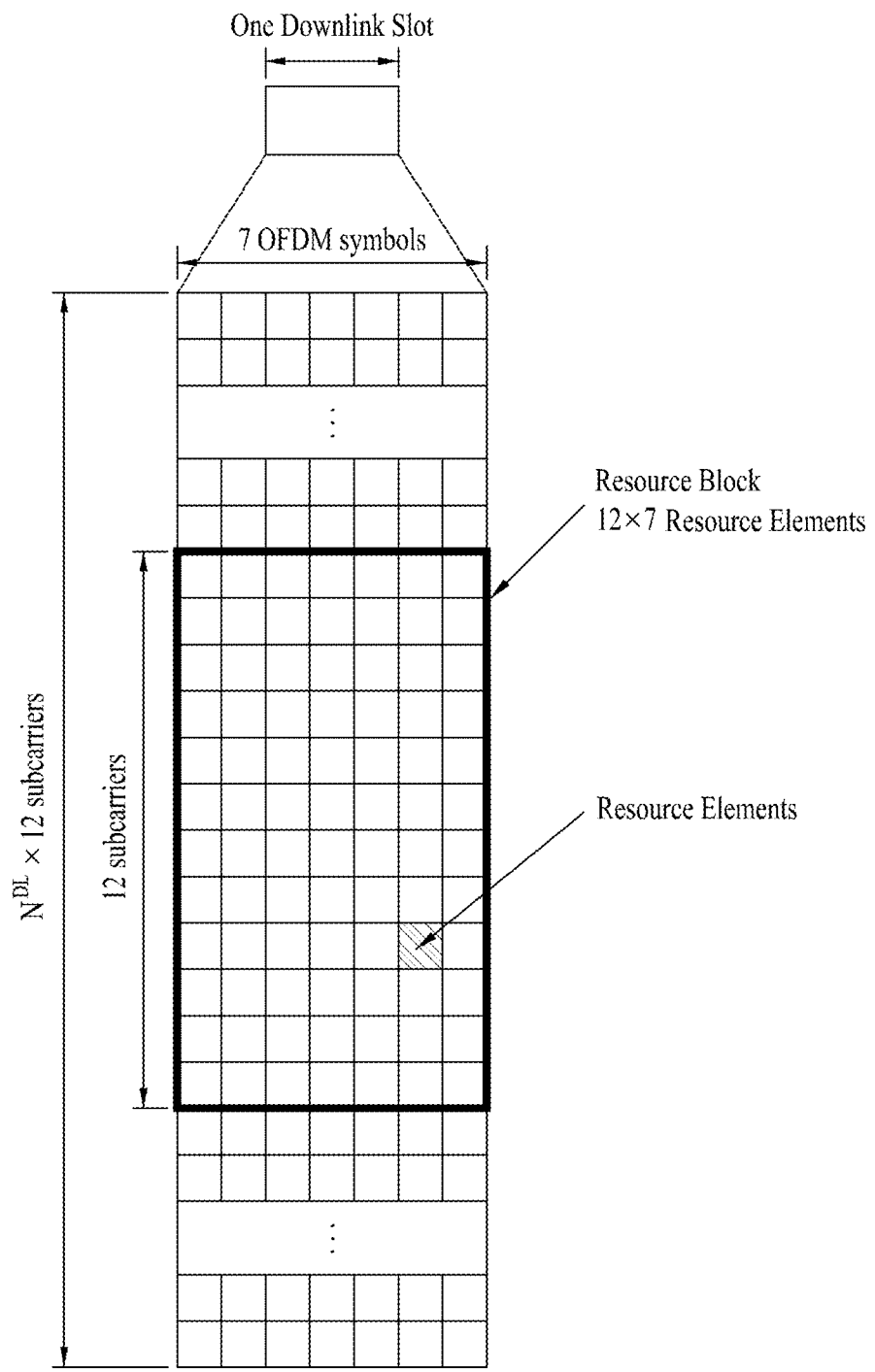
FIG. 3 illustrates a resource grid in a downlink slot.

FIG. 3 illustrates a resource grid in a downlink slot. Herein, although FIG. 2 shows an example of one downlink slot including 7 OFDM symbols in the time domain and of one resource block (RB) including 12 subcarriers in a frequency domain, the present invention will not be limited only to the example presented herein. For example, in case of a normal CP (Cyclic Prefix), one slot may include 7 OFDM symbols. However, in case of an extended CP (Cyclic Prefix), one slot may include 6 OFDM symbols. Herein, each element within a resource grid is referred to as a resource element (RE). And, one resource block includes 12×7 resource elements. And, $N^{DL}$ number of resource blocks included in a downlink slot is in accordance with the downlink transmission bandwidth. The structure of an uplink slot may be identical to the structure of a downlink slot.

Figure 4:
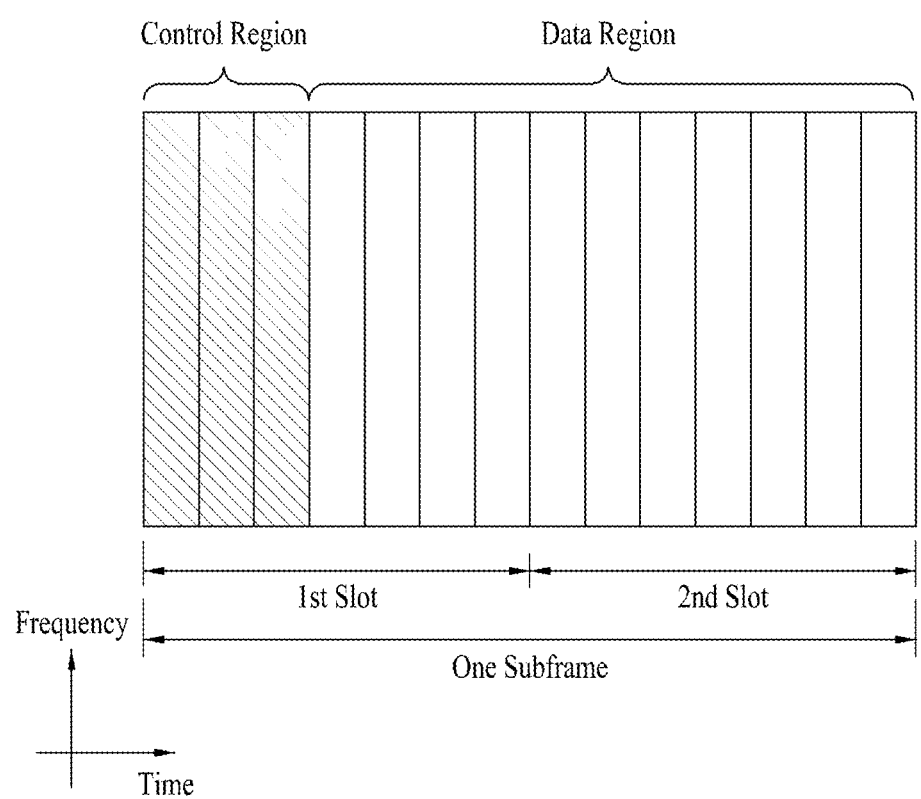
FIG. 4 illustrates an exemplary structure of a downlink subframe.

FIG. 4 illustrates the structure of a downlink subframe. In a subframe, a maximum of 3 OFDM symbols located at the front portion of a first slot within one sub-frame corresponds to a control region wherein a control channel is allocated (or assigned). The remaining OFDM symbols correspond to a data region wherein a Physical Downlink Shared Chancel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a sub-frame and being used in the control channel transmission within the sub-frame. As a response to an uplink transmission, the PHICH includes HARQ ACK/NACK signals. The control information being transmitted through the PDCCH is referred to as Downlink Control Information (DCI). Herein, the DCI may include uplink or downlink scheduling information or may include an uplink transmission power control command on a random terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCR corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or purpose of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to system information (more specifically, if the PDCCH belongs to a system information block (SIB)), a system information identifier and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

Figure 5:
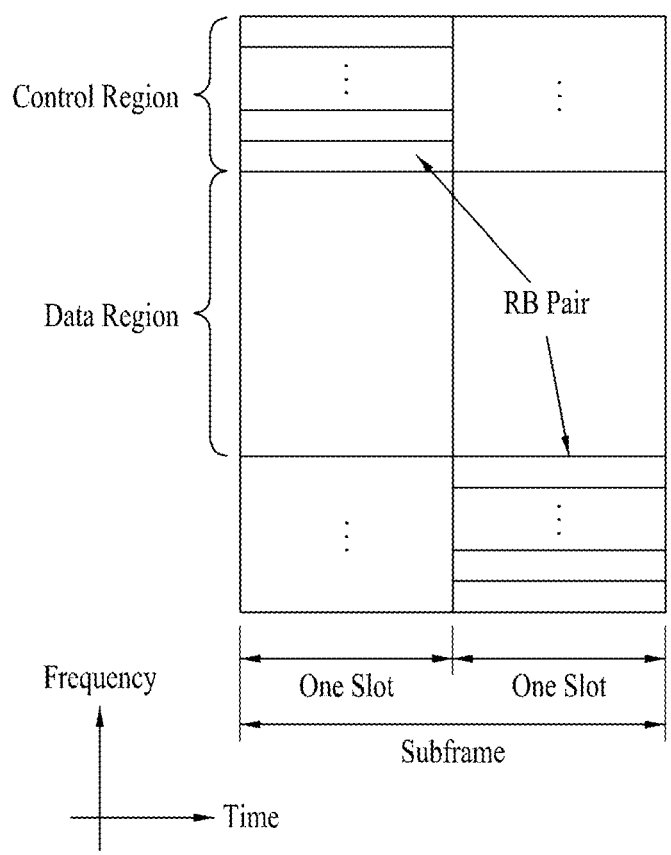
FIG. 5 illustrates an exemplary structure of an uplink subframe.

FIG. 5 illustrates the exemplary structure of an uplink subframe. In a frequency domain, an uplink sub-frame may be divided into a control region and a data region. A Physical Uplink Control Channel (PUCCH) including uplink control information is allocated to the control region. And, a Physical uplink shared channel (PUSCH) including user data is allocated to the data region. In order to maintain the characteristic of a unique (or single) carrier, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different subcarrier for 2 slots. This state may be referred to as the resource block pair, which is allocated to the PUCCH, as being "frequency-hopped" at the slot boundary.

Relay Node Configuration

Referring back to FIG. 1, the relay node (120) performs the role of forwarding the transmission and/or reception between the base station (110) and the user equipment (131). Herein, two different links (Backhaul link and Access link) each having a different property are applied in each carrier frequency band. When a Backhaul link between the base station (110) and the relay node (120) uses a downlink frequency band or downlink subframe resource, such Backhaul link may be expressed as a Backhaul downlink. And, when a Backhaul link between the base station (110) and the relay node (120) uses an uplink frequency band or uplink subframe resource, such Backhaul link may be expressed as a Backhaul uplink. Herein, the frequency band corresponds to a resource being assigned in an FDD (Frequency Division Duplex) mode, and the subframe corresponds to a resource being assigned in a TDD (Time Division Duplex) mode. Similarly, when an Access link between the relay node (120) and the user equipment(s) (131) uses a downlink frequency band or downlink subframe resource, such Access link may be expressed as an Access downlink. And, when an Access link between the relay node (120) and the user equipment(s) (131) uses an uplink frequency band or uplink subframe resource, such Access link may be expressed as an Access uplink. FIG. 1 illustrates the configurations of Backhaul uplink/downlink and Access uplink/downlink of an FDD mode relay node.

The base station requires a function of performing uplink reception and downlink transmission, and the user equipment requires a function of performing uplink transmission and downlink reception. Meanwhile, the relay node requires all functions of performing Backhaul uplink transmission to the base station, performing Access uplink reception from the user equipment, performing Backhaul downlink reception from the base station, and performing Access downlink transmission to the user equipment. More specifically, as shown in Table 1 below, the relay station requires both transmission and reception functions for each of the uplink and the downlink.

TABLE 1

| Function | Base Station | Relay Node | User Equipment |
|---|---|---|---|
| Downlink Transmission | ○ | ○ | X |
| Downlink Reception | X | ○ | ○ |
| Uplink Transmission | X | ○ | ○ |
| Uplink Reception | ○ | ○ | X |

Figure 6:
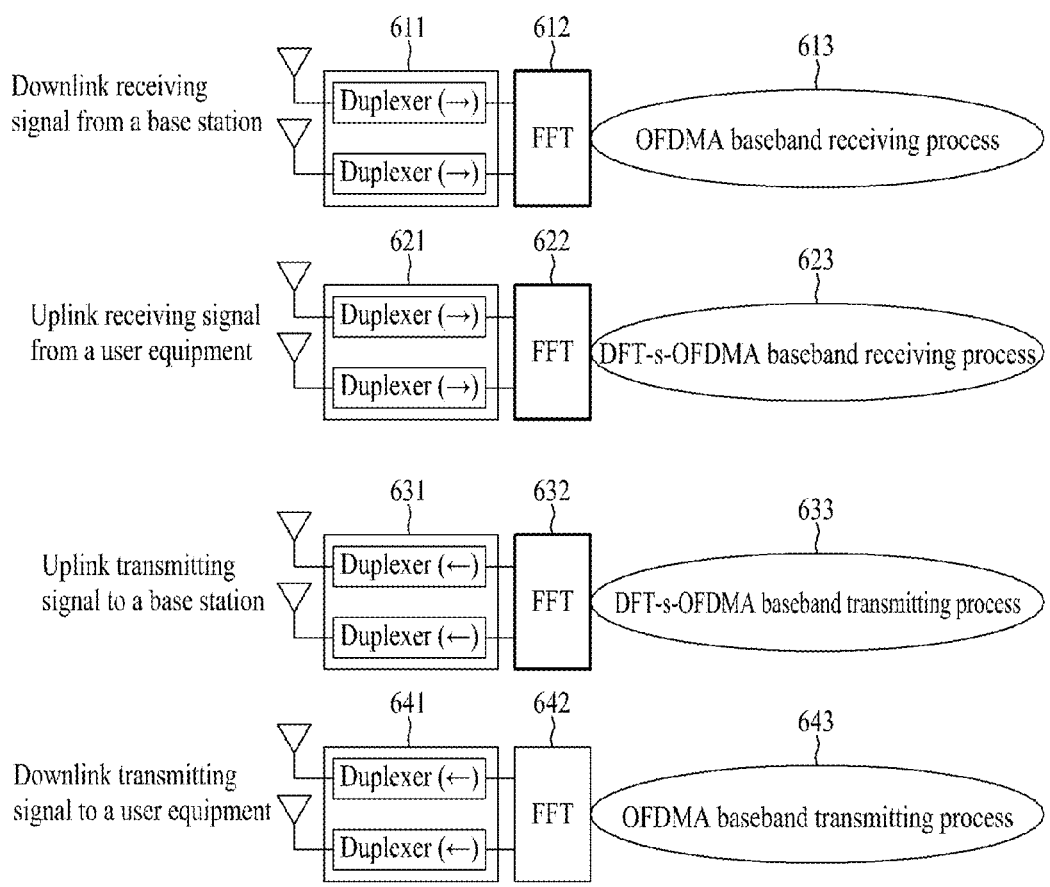
FIG. 6 illustrates an exemplary implementation of function performed by a transmitting end and a receiving end within an FDD mode relay node.

FIG. 6 illustrates an exemplary implementation of function performed by a transmitting end and a receiving end within an FDD mode relay node. The concept of the receiving (or reception) function of the relay station will now be described in detail. A downlink reception signal transmitted from the base station passes through a duplexer (611), so as to be delivered to an FFT (Fast Fourier Transform) module (612), thereby enabling an OFDMA baseband reception process (613) to be performed. An uplink reception signal transmitted from the user equipment passes through a duplexer (621), so as to be delivered to an FFT module (622), thereby enabling a DFT-s-OFDMA (Discrete Fourier Transform-spread-OFDMA) baseband reception process (623) to be performed. The downlink signal reception process from the base station and the uplink signal reception process from the user equipment may be concurrently (or simultaneously) performed in parallel. Meanwhile, the concept of the transmitting (or transmission) function of the relay station will now be described in detail. An uplink transmission signal may be transmitted to the base station by being processed with a DFT-s-OFDMA (Discrete Fourier Transform-spread-OFDMA) baseband transmission process (633) and then by passing through an IFFT (Inverse FFT) module (632) and a duplexer (631). And, an uplink transmission signal may be transmitted to the user equipment by being processed with an OFDM baseband transmission process (643) and then by passing through an IFFT module (642) and a duplexer (641). The uplink signal transmission process to the base station and the downlink signal transmission process to the user equipment may be concurrently (or simultaneously) performed in parallel. Also, the duplexers, which are each illustrated to perform one-way transmission and/or reception, may be realized as a two-way duplexer. For example, the duplexer (611) and the duplexer (631) may be realized as one two-way duplexer, and the duplexer (621) and the duplexer (641) may be realized as another two-way duplexer. In case of the two-way duplexer, a two-way duplexer may be realized to have a structure wherein an IFFT module and baseband process module line, which is associated with the transmission and/or reception over a specific carrier frequency band, is divided.

Meanwhile, the case wherein the Backhaul link is operated in the same frequency band as the access link is referred to as an 'in-band', and the case wherein the Backhaul link and the access link are each operated in a different frequency band is referred to as an 'out-band'. In case of an in-band relay station, for example, when a Backhaul downlink reception from the base station and an access downlink transmission are performed at the same time in a predetermined frequency band, a transmitted signal from the transmitting end of the relay station may be received by the receiving end of the relay station. And, accordingly, a signal interference or RF jamming may occur at the RF front-end of the relay station. Similarly, when an access uplink reception from the user equipment and a Backhaul uplink transmission to the base station is performed at the same time in a predetermined frequency band, signal interference may occur at the RS front-end of the relay station. In order to prevent such signal interference from occurring, settings may be made in the relay station so that transmission and reception cannot be performed simultaneously in the relay station within the same frequency band. For example, a TDM (Time Division Multiplexing) method may be used between the Backhaul downlink reception and the access downlink transmission, so that a Backhaul downlink can be received by the relay station during a predetermined time section in a predetermined frequency band, and also so that an access downlink can be transmitted by the relay station during another time section. Similarly, a TDM method may also be used between the Backhaul uplink reception and the access uplink transmission. Herein, the relay station that is operated as described above may also be referred to as a half-duplex relay station. In this case, a Guard Time for shifting (or switching) the transmitting/receiving operations of the relay station is required to be set-up. For example, in order to perform switching between a Backhaul downlink reception and an access downlink transmission, a Guard Time may be set-up in a subframe that is set-up for the Backhaul downlink reception.

Carrier Aggregation

In a general wireless communications system, even when the bandwidth for each of an uplink and a downlink is set up differently, only a single carrier is being taken into consideration. For example, based on the single (or unique) carrier structure, the number of carriers configuring each of the uplink and the downlink respectively corresponds to 1. And, accordingly, a wireless communications system, wherein the bandwidth of the uplink and the bandwidth of the downlink are generally symmetrical to one another, may be provided.

The ITU (International Telecommunication Union) is requesting the candidate technology of IMT-Advanced to support a more expanded bandwidth as compared to that of the conventional wireless communications system. However, with the exception for a select area throughout the world, there still exist many difficulties in allocating a large bandwidth frequency. Therefore, in order to resolve such difficulties, a carrier aggregation (also referred to as bandwidth aggregation or spectrum aggregation) technology is currently under development. The carrier aggregation technology corresponds to a technology developed for an efficient usage of small segmented bands. More specifically, a plurality of small bands is physically grouped in the frequency domain so that the group of segmented bands can be logically used as one large band.

The carrier aggregation technology is adopted so as to support an increasing throughput, to prevent an increase in the manufacturing cost caused by the addition of a broadband RF device, and to ensure backward compatibility with the conventional system. More specifically, carrier aggregation refers to a technology enabling a user equipment (or terminal) and a base station to exchange data to and from one another through multiple groups of carriers of a bandwidth unit defined by the conventional wireless communications system (e.g., the LTE system in case of the LTE-A system, and the IEEE 802.16e system in case of the IEEE 802.16m system).

Herein, the carrier of the bandwidth unit defined by the conventional wireless communications system may be referred to as a component carrier (CC). For example, the carrier aggregation technology may include a technology supporting a system bandwidth of up to a maximum of 100 MHz by grouping a maximum of 5 component carriers, even when one component carrier supports the bandwidth of 5 MHz, 10 MHz or 20 MHz.

The carrier aggregation (or multi-carrier) technique corresponds to a technique enabling signals to be exchanged during a random transmission time interval (TTI) through a single component carrier group. A downlink carrier aggregation may be described as the base station supporting downlink transmission to the user equipment by using a frequency domain resource (a sub-carrier or PRB (Physical Resource Block)) of at least one or more sub-carrier bands within a time domain resource (a sub-frame unit). Similarly, an uplink carrier aggregation may be described as the user equipment supporting uplink transmission to the base station by using a frequency domain resource (a sub-carrier or PRB) of at least one or more sub-carrier bands within a time domain resource (a sub-frame unit). Hereinafter, although exemplary uplink/downlink between the base station and the user equipment will be described, the above-described carrier aggregation technique may also be applied to the above-described transmission and/or reception technique via Backhaul link between the base station and the relay node and/or via Access link between the relay node and the user equipment.

Figure 7:
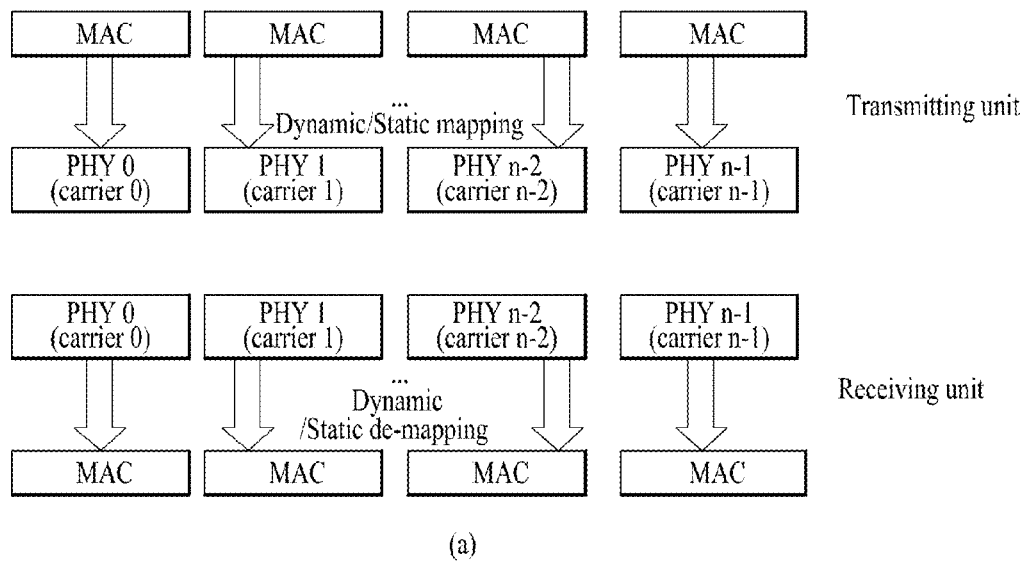
FIG. 7 illustrates configurations of a physical layer and a MAC Layer of a multi-carrier support system.
Figure 7:
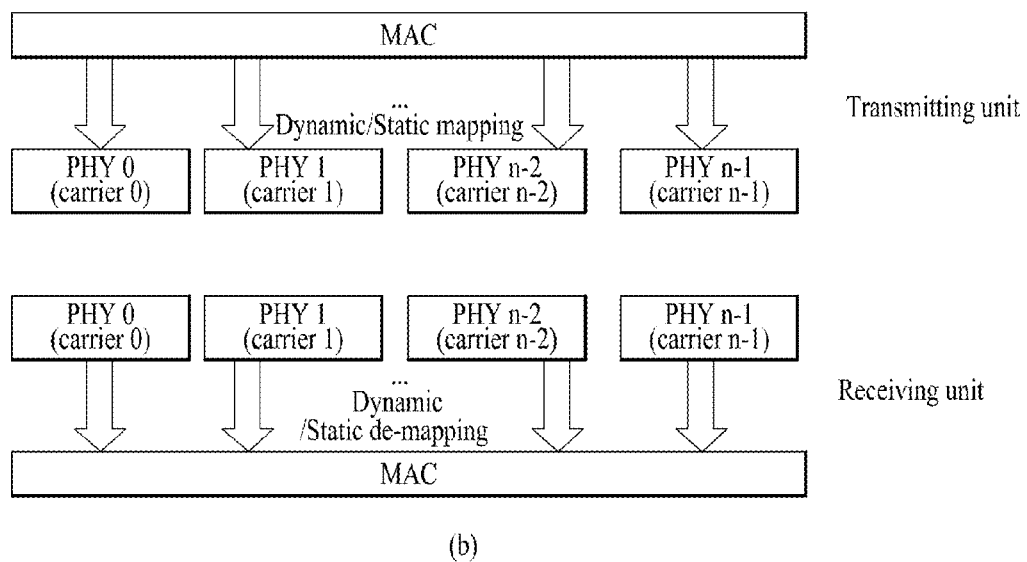
Figure 8:
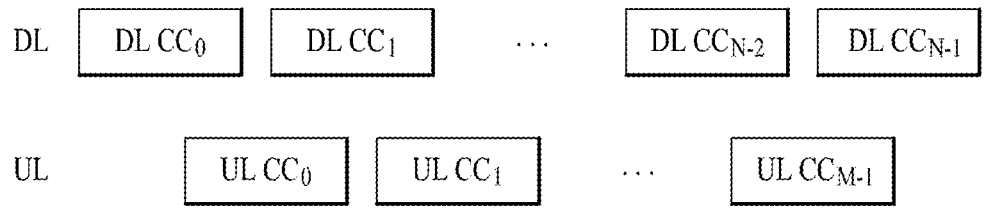
FIG. 8 illustrates exemplary configurations of downlink/uplink component carriers (CCs).

The configuration of a physical layer ($1^{st}$ layer, L1) and a MAC layer ($2^{nd}$ layer, L2) of a multi-carrier supporting system will hereinafter be described in detail with reference to FIG. 7. A base station of the conventional wireless communication system, which supports a single carrier, includes one physical layer (PHY) entity supporting one carrier, and one MAC (Medium Access Control) entity for controlling one PHY entity may also be provided in the base station. For example, in the PHY layer, a baseband processing operation may be performed. And, for example, in the MAC layer, a receiving unit may generate a MAC PDU (Protocol Data Unit) and may perform operations of an L1/L2 scheduler including MAC/RLC sub-layers. A MAC PDU packet block of the MAC layer passes through a logical transport layer so as to be converted to a transport block, thereby mapped to a physical layer input information block.

Meanwhile, in a multi-carrier supporting system, a plurality of MAC-PHY entities may be provided. More specifically, as shown in FIG. 7a, a transmitter and a receiver of the multi-carrier supporting system may be configured to have one MAC-PHY entity corresponding each of n number of component carriers. Since an independent PHY layer and an independent MAC layer are configured for each component carrier, a PDSCH may be generated for each component carrier in the physical layer from the MAC PDU.

Alternatively, a multi-carrier supporting system may also be configured by using a single common MAC entity and a plurality of PHY entities. More specifically, as shown in FIG. 7b, a transmitter and a receiver of the multi-carrier supporting system may be configured to have n number of PHY entities respectively correspond to each of the n number of component carriers and to have one common MAC entity control the n number of PHY entities. In this case, a MAC PDU from a single MAC layer may be divided into a plurality of transport blocks each corresponding to the plurality of component carriers within the transport layer. Alternatively, when generating a MAC PDU in the MAC layer, or when generating an RLC PDU in an RLC layer, the PDU may be divided with respect to each component carrier. Accordingly, a PDSCH may be generated for each component carrier within the physical layer.

The PDCCH, which transmits control information for L1/L2 control signaling generated from a packet scheduler of the MAC layer, may be mapped to a physical resource for each separate component carrier, thereby being transmitted. Herein, the PDCCH, which includes control information (downlink allocation or uplink grant) for the PDSCH or PUSCH transmission for a specific user equipment, may be separately encoded for each component carrier to which the corresponding PDSCH/PUSCH is transmitted. Such PDCCH may be referred to as a separate coded PDCCH. Meanwhile, control information for PDSCH/PUSCH transmission of multiple component carriers may be configured as a single PDCCH so as to be transmitted. And, such PDCCH may be referred to as a joint coded PDCCH.

In order to support carrier aggregation, a connection between the base station and the user equipment is required to be set up, or a preparation for a connection set-up between the base station and the user equipment (or relay station) is required to be made, so that a control channel (PDCCH or PUCCH) and/or a shared channel (PDSCH or PUSCH) can be transmitted. In order to perform such connection/connection set-up for each specific user equipment (or relay station), a measurement and/or reporting process on the carrier is required to be performed. And, component carriers corresponding to the targets of such carrier measurement and/or reporting, may be assigned (or allocated). More specifically, component carrier assignment refers to setting up component carriers (i.e., designating number component carriers and component carrier index) that are used for uplink/downlink transmissions, among the uplink/downlink component carriers configured in the base station, while taking into consideration the capability of the specific user equipment (or relay station) and the system environment.

At this point, when a $3^{rd}$ layer (L3) RRM (Radio Resource Management) controls component carrier assignment, UE-specific or RN-specific RRC signaling may be used. Alternatively, cell-specific or cell cluster-specific RRC signaling may also be used. When a dynamic control is required when performing component carrier allocation, a predetermined PDCCH may be used for L1/L2 control signaling, or a physical control channel dedicated to component carrier assignment control information or a PDSCH configured in an L2 MAC message format may also be used. Meanwhile, when a packet scheduler controls the component carrier assignment (or allocation), a predetermined PDCCH may be used for L1/L2 control signaling, or a physical control channel dedicated to component carrier assignment control information may be used, or a PDSCH configured in an L2 MAC message format may be used.

Relay Node Backhaul Downlink Subframe Configuration

As a relay node, which is configured to perform the function of delivering data and control information between the user equipment and the base station (or cell), is being applied in an FDD mode or TDD mode system, a Backhaul uplink/downlink between the base station and the relay station and an Access uplink/downlink between the relay node and the user equipment may be defined as described above. A relay node being configured of independent RRM (radio resource management) and L1/L2 layers, having a separate physical cell ID, and having the same functionality as the base station may be defined as a type-1 relay node.

In realizing a general relay node, an Access link and a Backhaul link may be partitioned in subframe units having the length of 1 ms, within the same frequency carrier (i.e., the same IFFT/FFT areas), by using a TDM method. Herein, connection with user equipments (hereinafter referred to as 'legacy user equipments (legacy-UEs)'), which operate in accordance with a wireless communication system that does not include a relay node (e.g., the conventional release-8 or 9 system), is required to be supported. More specifically, backward-compatibility is required to be supported. At this point, the relay node is required to support a function of measuring the legacy user equipments existing within its area. Therefore, even in a subframe that is set-up (or configured) for a Backhaul downlink transmission, in the first N (N=1, 2, or 3) number of OFDM symbols sections, instead of receiving a Backhaul downlink, the relay node is required to perform an Access downlink transmission.

Figure 9:
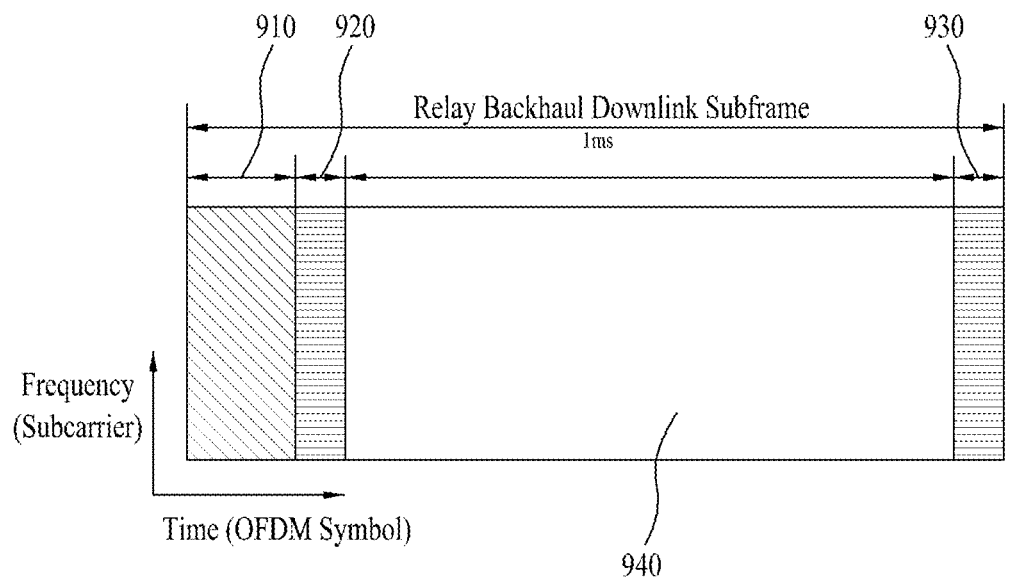
FIG. 9 illustrates an exemplary Backhaul downlink subframe structure.

FIG. 9 illustrates an exemplary Backhaul downlink subframe structure.

In FIG. 9, a relay node non-hearing section (910) indicates a section wherein the relay node transmits an Access downlink signal without receiving a Backhaul downlink signal. As described above, this section (910) may be set up to have a length of 1, 2, or 3 OFDMs.

Guard time (920) corresponds to a section during which the relay node switches the receiving/transmitting mode, and guard time (930) corresponds to a section during which the relay node switches the receiving/transmitting mode. The length of a guard time may be given as a value of a time domain, or the length of a guard time may be set to be equal to k number of time sample values based upon a time sample (Ts) value. For example, when a relay node Backhaul downlink subframe is contiguously (or consecutively) configured, or depending upon a predetermined subframe timing alignment relation, the guard time (930) corresponding to the last portion of the subframe may be defined or may not be determined at all. The guard time (920 and 930) may be defined only within a frequency domain, which is determined for a relay node Backhaul downlink subframe transmission within a predetermined downlink component carrier (CC).

In a relay node Backhaul downlink receiving section (940), the relay node may receive a PDCCH and a PDSCH from the base station. These channels may also be expressed as R-PDCCH (Relay-PDCCH) and R-PDSCH (Relay-PDSCH) in the sense that the PDCCH and the PDSCH correspond to physical channel dedicated to the relay node. Additionally, in some cases, during this section (940), the relay node may also receive a PCFICH (i.e., R-PCFICH) and/or a PHICH (i.e., R-PHICH) from the base station.

Furthermore, in defining a transmission symbol (or transport symbol) within a subframe shown in FIG. 9, the OFDM symbols respective to the relay node non-hearing section (910) and the OFDM symbols respective to the remaining sections (920, 930, and 940) may each be independently defined as OFDM symbols having an extended CP applied thereto or as OFDM symbols having a normal CP applied thereto.

In a situation where the R-PDDCH and R-PDSCH (or the R-PCFICH and R-PHICH depending upon the defined situation) channels are configured within a relay node Backhaul downlink subframe, and where the configured channels are each mapped to a physical resource and, then, transmitted, diverse methods according to the present invention for specifying the relay node Backhaul downlink channel transmission mode based upon a reference signal, which is used for performing demodulation in accordance with a transmission mode that is applied to the above-described channels, will hereinafter be described in detail.

FIG. 10 to FIG. 15 respectively illustrate diverse exemplary methods for assigning R-PDCCH and R-PDSCH within R-PDCCH and R-PDSCH transmission areas (940 of FIG. 9).

Figure 10:
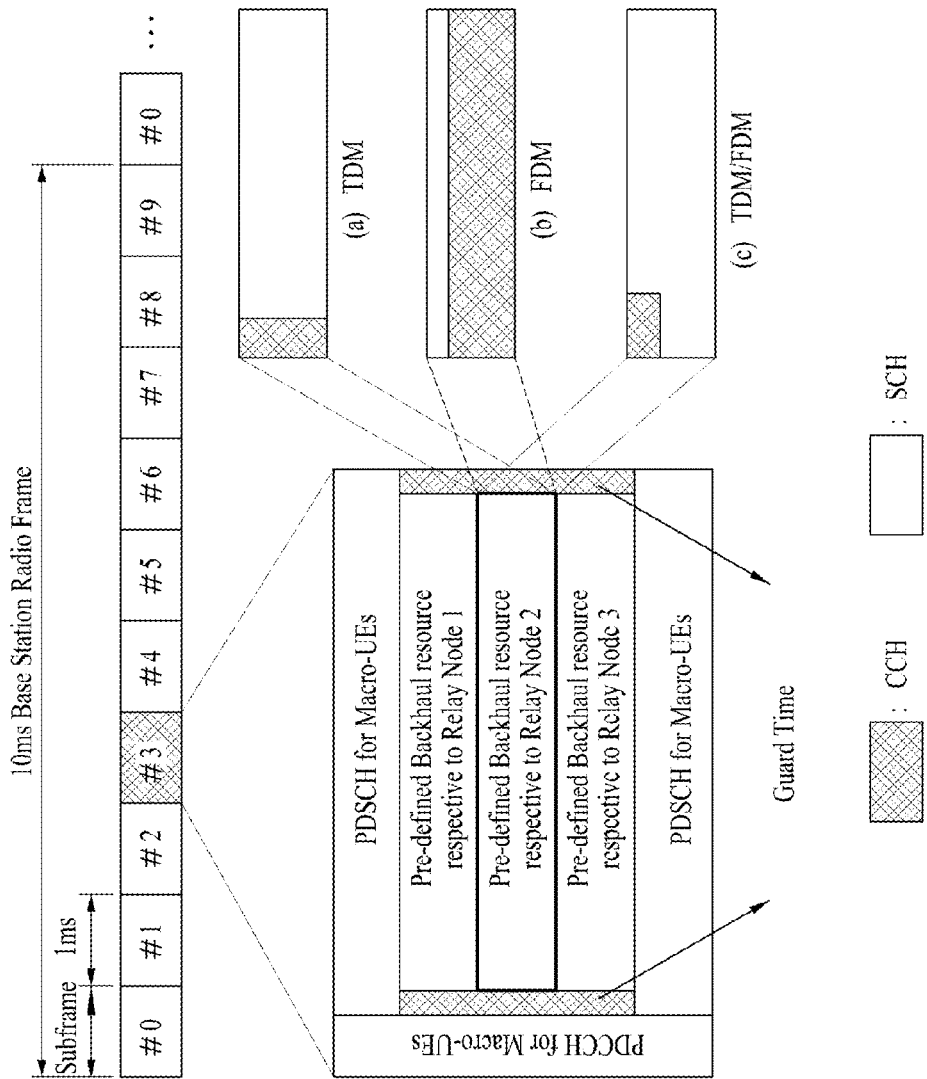
FIG. 10 to FIG. 15 respectively illustrate diverse exemplary methods for assigning R-PDCCH and R-PDSCH within R-PDCCH and R-PDSCH transmission areas (940 of FIG. 9).

FIG. 10 illustrates an exemplary method for semi-statically assigning an R-PDCCH transmission resource.

Based upon the fact that a Backhaul transmission size (or amount) does not largely vary in accordance to the time, due to a statistical multiplexing between different user equipments, it may be preferable to use a method for assigning Backhaul resource that decides a Backhaul resource size in advance and that only allows changes in long term resources. According to the above-described method, it may be adequate to use a fixed transmission format with respect to the Backhaul link. A channel resource (i.e., a pre-defined Backhaul resource respective to the relay node), which is shared in the Backhaul subframe, may be semi-persistently scheduled with respect to each relay node. In order to adjust the assignment and configuration of the resource, a higher-level layer (or upper layer) signaling (e.g., RRC signaling), which is initiated by the base station or the relay node, may be used.

As shown in (a) to (c) of FIG. 10, in a Backhaul resource pre-defined with respect to a specific relay node, a control channel (CCH) including L1/L2 control information (e.g., HARQ ACK/NACK, CQI/PMI feedback, scheduling grant, and so on) respective to the corresponding relay node may be multiplexed with Backhaul data (SCH) by using the TDM and/or FDM method. Additionally, the control information may also be transmitted along with the Backhaul data by using a piggyback method. And, the control information may be encoded and modulated with the data.

According to the semi-static Backhaul resource assignment (or allocation) method, the control information for relay node resource assignment may be required less, and the work load of the base station scheduler may be reduced and alleviated in accordance with semi-static resource reservation. However, when using the semi-static Backhaul resource assignment method, it may be difficult to expect excellent response to diverse situations in the aspects of Backhaul link management and error recovery.

Figure 11:
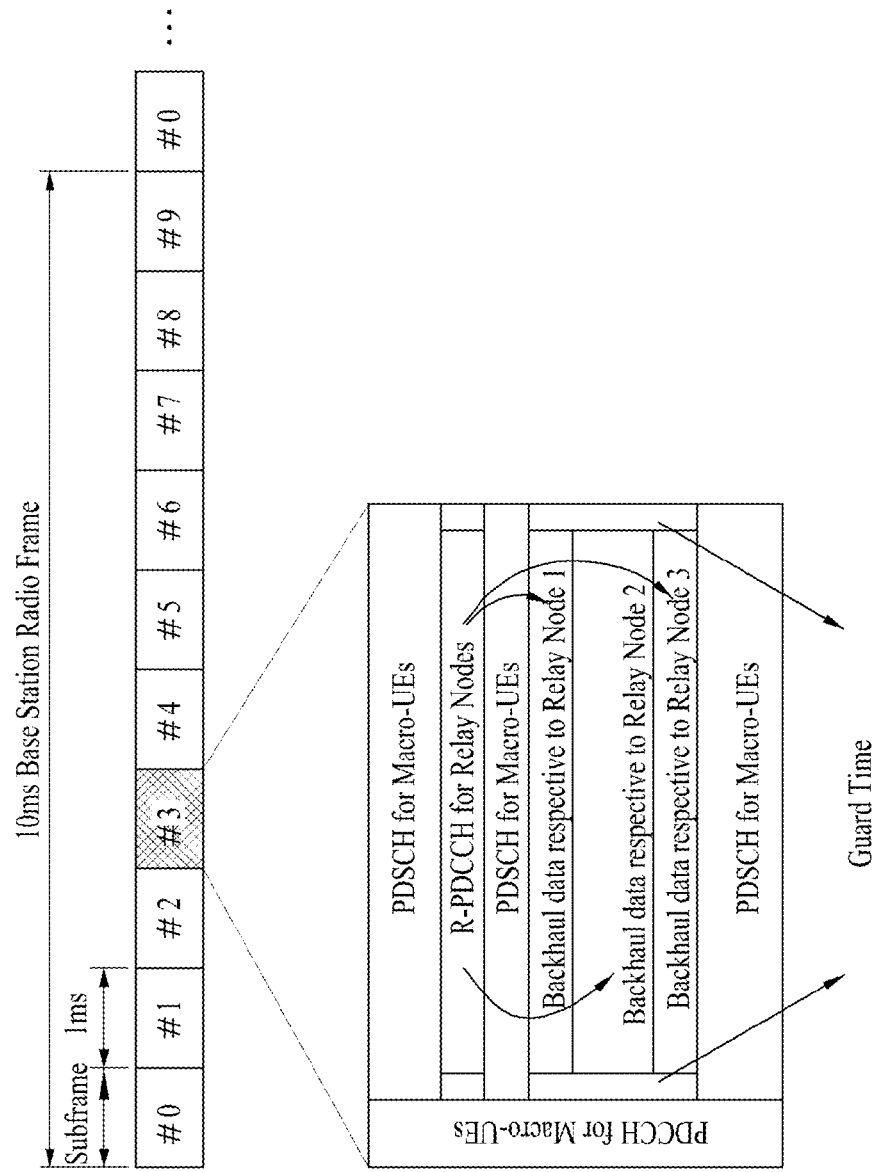

FIG. 11 illustrates an exemplary configuration using the FDM method, in a method for dynamically assigning an R-PDCCH transmission resource.

This method corresponds to a method for directly assigning resource for an R-PDCCH without any influence from other Macro-UEs. As shown in FIG. 11, in this method, it may be considered to perform R-PDCCH transmission by using one or more RBs (Resource Blocks) within a PDSCH area. More specifically, the R-PDCCH may be multiplexed with Backhaul data respective to the relay nodes within the frequency domain.

The FDM type multiplexing of the Backhaul data respective to the relay nodes and the R-PDCCH corresponds to a simple method of assigning areas respective to the R-PDCCH without any influence of the Macro-UEs. And, without any limitation, flexibility may be fully ensured when a Macro base station schedules a Backhaul link and an Access link. However, since the relay node can perform decoding on the Backhaul data only after completely receiving the R-PDCCH, which is being transmitted from the relay node throughout the entire subframe, the FDM type multiplexing method may cause a delay in data decoding.

Figure 12:
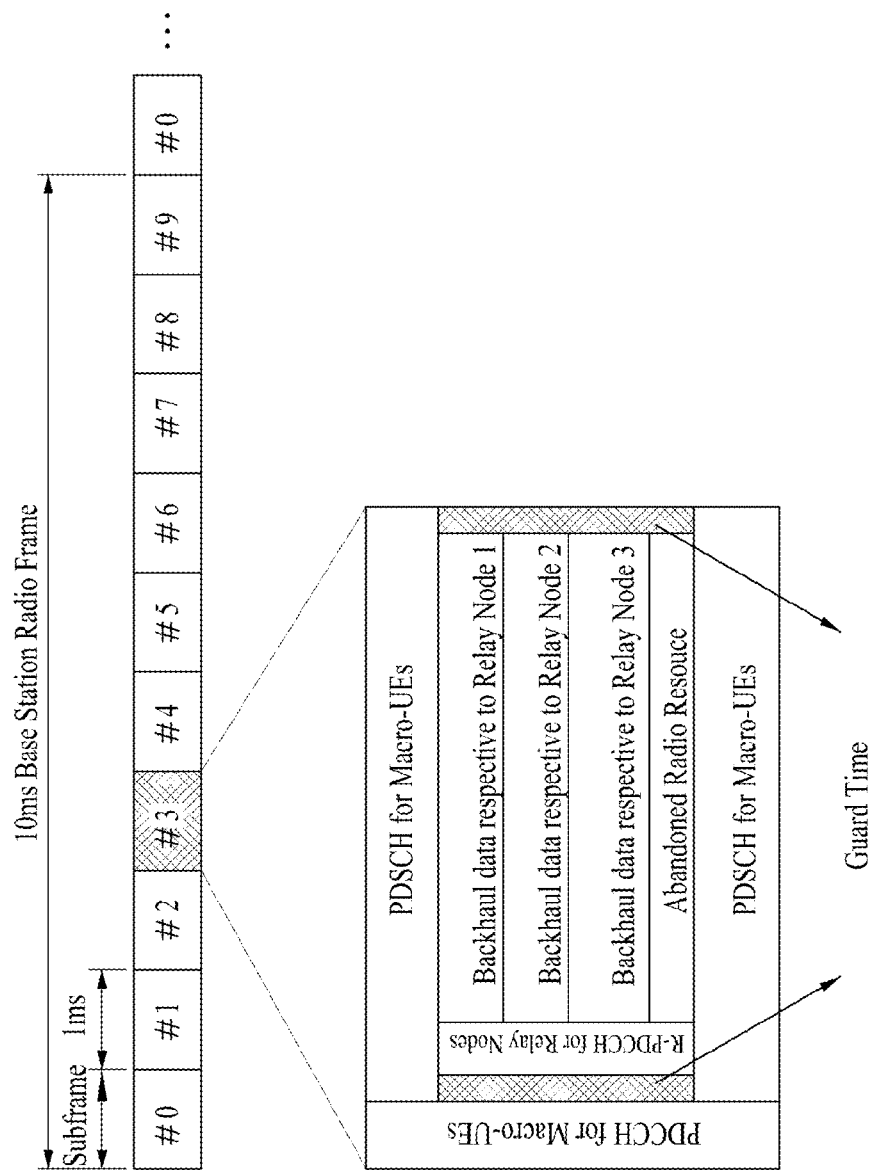

FIG. 12 illustrates an exemplary configuration using the TDM method, in a method for dynamically assigning an R-PDCCH transmission resource.

As another method for assigning R-PDCCH resources respective to relay nodes, in this method, it may be considered to multiplex Backhaul data respective to relay nodes with the R-PDCCH in the time domain. In this case, in order to maintain backward-compatibility with Macro-UEs, the base station may be required to define in advance a portion of the downlink resources as a relay zone (or relay node area) that is used for the Backhaul transmission directed to the relay nodes. Within the relay zone, the R-PDCCH and the Backhaul data may be multiplexed in the time domain by using the same method used by the conventional LTE system for multiplexing the PDCCH and the PDSCH. The relay zone for performing R-PDCCH and Backhaul data transmission may be determined via higher layer (or upper layer) signaling by using a semi-persistent method.

In this case, by dispersing the R-PDCCH assignment within the frequency domain, frequency diversity may be gained when the relay node decodes the control information. And, as compared to the FDM method of FIG. 11, the processing time, which is required for each of the relay nodes to receive the Backhaul data, may be reduced. However, since the relay zone is semi-persistently assigned, limitation may occur in the flexible scheduling of the base station and in efficiently using the radio (or wireless) resources. More specifically, since the relay zone is defined in advance, the radio resources may not be efficiently used, such as the discarded (or abandoned) radio resource portions shown in FIG. 12.

Figure 13:
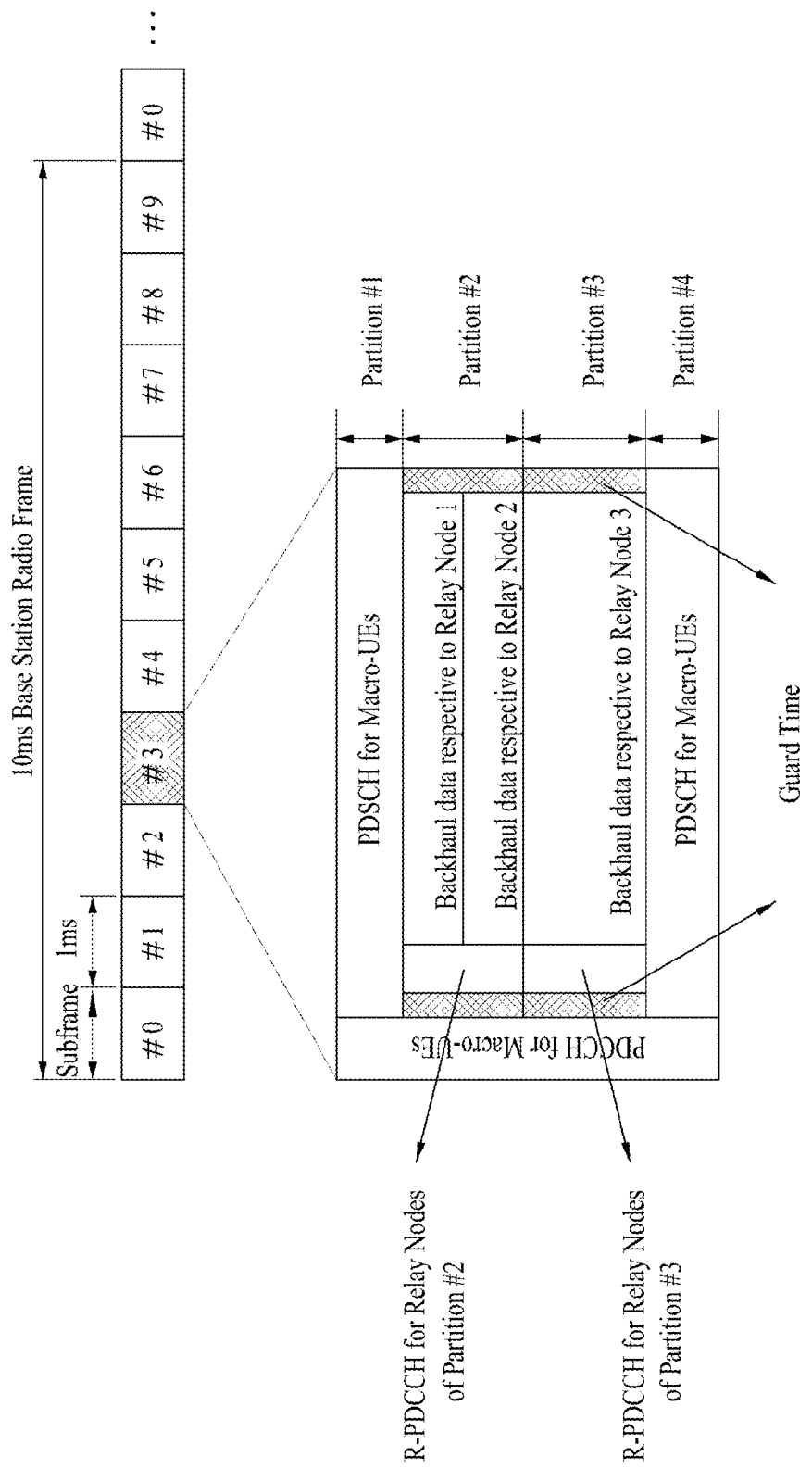

FIG. 13 illustrates another exemplary configuration using the TDM method, in a method for dynamically assigning an R-PDCCH transmission resource.

In order to reduce the limitation in the flexibility of the scheduling process associated with FIG. 12, and in order to enhance the frequency-selective scheduling gain, in this method, it may be considered to dynamically assign the relay zone. In this case, the entire band may be divided (or partitioned) into multiple partitions. And, among the plurality of divided partitions, one partition may be configured of a group of RBs. A partition may be used for transmitting R-PDSCH respective to the Macro-UEs, or a partition may also be used for performing Backhaul transmission for the relay nodes. When a frequency resource partition is used for Backhaul transmission, the R-PDCCH for each relay node and the Backhaul data may be multiplexed in the time domain within the corresponding partition. In the method of FIG. 13, by controlling a number of partitions used in the Backhaul transmission for the relay nodes, as compared to the semi-persistent relay zone assignment method of FIG. 12, the relay node may be capable of dynamically assigning the relay zone. The relay node may receive signaling from the base station indicating which partition is to be used as the relay zone or which partition is to be used for the PDSCH transmission respective to the Macro-UEs (e.g., bitmap indication), or the relay node may also blind-search each of the partitions. Alternatively, a detailed signaling method for indicating the relay zone may be determined.

Figure 14:
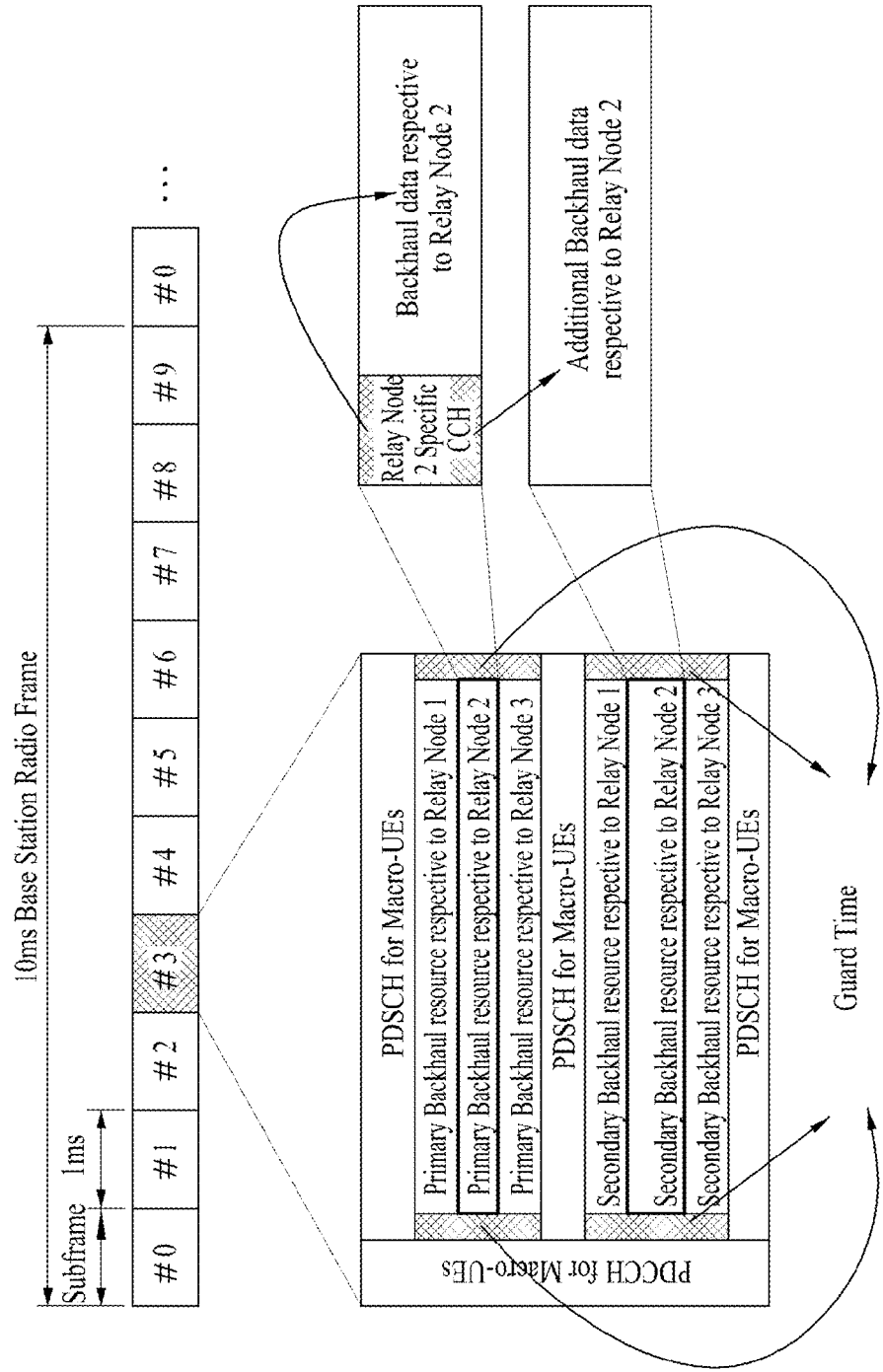

FIG. 14 illustrates an exemplary configuration using the FDM/TDM method, in a method for dynamically assigning an R-PDCCH transmission resource.

Pre-defining the R-PDCCH area (or zone) respective to all relay nodes within the base station zone (or base station area) may be simple. However, the process of searching all of the R-PDCCHs under the assumption that a relay traffic exists in all Backhaul subframes may cause a work load (or weight) on the relay nodes. When it is assumed that the channel condition slowly (or gradually) varies in accordance with time and that a relay node-specific CCH resource is assigned by an upper layer (or higher-level layer), it may be considered not to apply the blind decoding method with respect to the dynamic resource assignment (or allocation). Accordingly, as shown in FIG. 14, it may be considered to design the relay node-specific CCH assignment by using the FDM/TDM method.

In this case, two (2) different types of downlink Backhaul areas (or zones) may exist. One may be referred to as a Primary Backhaul Resource (PBR), and the other may be referred to as a Secondary Backhaul Resource (SBR). As a pre-defined area (or zone) respective to each relay node, only a minimum amount (or size) of resource may be assigned to the PBR. Relay node-specific (or relay-specific) CCH and Backhaul data respective to the corresponding relay node may be assigned to the PBR. The PBR may be assigned to a frequency band having the highest quality with respect to each relay node, and this may be varies via upper layer signaling. Meanwhile, the SBR corresponds to a Backhaul resource, which is dynamically assigned in accordance with whether or not a traffic weight that cannot be accepted by the PBR has occurred. The CCH is not assigned to the SBR, and the scheduling information on the SBR is indicated by the CCH of the PBR area (or zone). More specifically, the scheduling information on the SBR may be signaled to the corresponding relay node through a relay-specific CCH, which is multiplexed with the Backhaul data in the PBR area.

Figure 15:
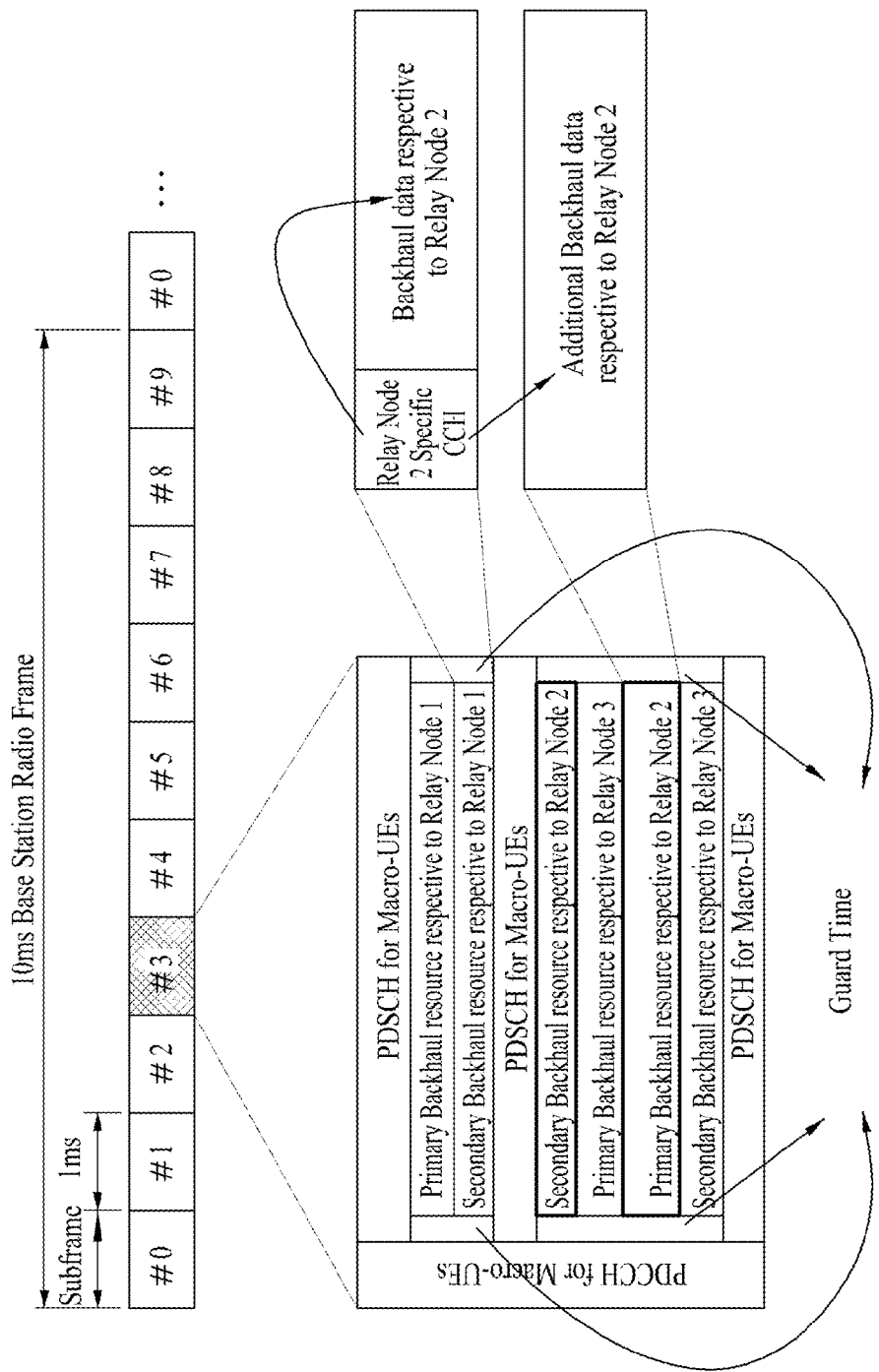

FIG. 15 illustrates an exemplary configuration using the FDM/TDM method, in a method for dynamically or semi-statically assigning an R-PDCCH transmission resource.

The base station may assign at least one or more RBs each having good channel quality with respect to each relay node for the relay-specific R-PDCCH. More specifically, the relay node within the base station zone may have an independent zone (or area) (the primary Backhaul resource (PBR) of FIG. 15) for receiving the R-PDCCH. And, the relay-specific R-PDCCH may be transmitted over the first one or more OFDM symbols within the PBR, and the remaining OFDM symbols may be used for the R-PDSCH transmission respective to the corresponding relay node. Depending upon the transmission size respective to the relay node, additional resources (the secondary Backhaul resource (SBR) of FIG. 15) may be assigned for another R-PDSCH transmission respective to the corresponding relay node.

The PBR respective to the relay node may be semi-persistently or dynamically assigned. When it is assumed that a channel between the relay node and the base station slowly (or gradually) varies in accordance with time, the PBR respective to the relay node may be semi-persistently assigned by higher layer signaling. And, accordingly, channel dependent scheduling gain may be acquired, and the complexity in searching R-PDCCHs may be reduced. Since the relay node knows the minimum downlink Backhaul resource in advance, the relay node and the base station may have a robust Backhaul connection.

Meanwhile, when a channel between the relay node and the base station is not static, the semi-persistent PBR scheduling may not acquire the channel dependent gain, and it may be preferable to perform a scattered (or dispersed) resource assignment on the PBR.

Herein, it should be noted that by allowing a blind PBR search, a dynamic PBR assignment may be performed so as to provide channel depended gain regardless of the channel condition. In this case, the relay node may not know the PBR position in advance, and the relay node may search the assigned PBR (and/or SBR) within a pre-defined search space. By dynamically assigning the PBR respective to the relay node, the base station may perform a completely flexible scheduling on the PDSCH transmission respective to the Macro-UE throughout the entire RB.

As described above, in FIG. 10 to FIG. 15, the R-PDCCH and the respective R-PDSCH resource assignment method have been mainly described. However, in some cases, R-PC-FICH transmission and R-PHICH transmission resource configuration may be realized, whenever required, in the R-PDCCH transmission resource section or the R-PDSCH transmission resource section corresponding to a random method, among the proposed methods.

In the following description of the present invention, when an additional or separate description is not provided, it will be apparent that the method for configuring the R-PCFICH transmission and R-PHICH transmission modes and a method for assigning resource of the reference signal using demodulation/decoding methods respective to the configured transmission modes will be defined to be identical to the various assignment methods of the R-PDCCH according to the various embodiments described above.

Channel Status Information Feedback Method

As described above, as a relay node is being applied to the communication system in order to deliver the transmission and/or reception between the base station and the user equipment, a Backhaul link and an Access link may be defined over a downlink resource (carrier frequency band or subframe) and an uplink resource (carrier frequency band or subframe). Accordingly, limitations in the above-described relay node subframe assignment may be considered.

Meanwhile, as part of a link adaptation over a downlink transmission, an Adaptive modulation and coding (AMC) method and a power control and/or assignment method, and so on, may be applied to a relay node Backhaul downlink subframe transmission performed by the base station or to an Access downlink subframe transmission performed by the relay node. In order to do so, the relay node (or relay-UE) is required to feed-back a Reference Signal (RS) received through a Backhaul downlink (or Access downlink) or downlink Channel Status Information (CSI), which is estimated from a data symbol, through a Backhaul uplink (or Access uplink) to the base station (or relay node). At this point, the channel status information (CSI) may be defined to include CQI (channel quality information), PMI (precoding matrix index) (or feedback codebook) and RI (rank information), which are defined in the conventional LTE system (e.g., Release-8). Also, the channel status information (CSI) may be defined to include all or at least one or more of a direct quantization vector, a channel quantization vector, a channel eigenvector, a channel eigenvalue, a channel covariance matrix, and so on. And, furthermore, such information may be indicated as an indirect parameter by the above-described PMI. Therefore, the channel status information (CSI) mentioned in the description of the present invention may also be defined as a random individual parameter among the diverse parameters described above, or may be defined as a term for collectively referring to the above-described parameters.

Hereinafter, in a situation where the Backhaul uplink and Access uplink transmission subframe assignment is limited, a method of the relay node and the relay-UE for respectively feeding-back the CSI for each of the Backhaul downlink and the Access downlink will be described in detail.

Periodic PUCCH/Periodic PUSCH Feedback Configuration

As a CSI feedback method of a relay node over a basic Backhaul downlink (or a relay-UE over an Access downlink), the relay node (or relay-UE) may receive configuration information for transmitting the CSI from the base station (or relay node). For example, an uplink transmission subframe through which the relay node (or relay-UE) is to feed-back the CSI, a frequency or code resource of the CSI feedback PUCCH/PUSCH. For example, the code resource may correspond to a cyclic shift or a root index of a sequence that is used for the CSI transmission. In case of the PUSCH, in addition to the above-described configuration information, configuration settings on a modulation order and code rate and a transmission method respective to the MIMO transmission mode may be received from the base station (or relay node).

As described above, the CSI transmission resource configuration received from the base station (or relay node) may either be performed via higher layer signaling or L1/L2 control signaling or be performed by following a pre-defined rule without any separate signaling.

In the description given above and the description that will be given hereinafter, higher layer signaling may, for example, be expressed as RRC signaling, and L1/L2 control signaling may, for example, correspond to a PDCCH having a predetermined DCI format, a dedicated physical control channel, or a PDSCH having an L2 MAC message format.

Meanwhile, among the above-described configuration information, when setting up CSI feedback transmission timing (i.e., cycle period and subframe level offset when performing periodic transmission), the following elements should be taken into considered. For example, the elements that should be taken into consideration include the configuration of a relay node Backhaul uplink subframe respective to a CSI feedback of a relay node corresponding to a relay node Backhaul downlink transmission, the configuration of an Access uplink subframe based upon the presence of an Access uplink blank subframe caused by the configuration of a relay node Backhaul uplink subframe respective to a CSI feedback of a user equipment corresponding to a relay node Access downlink transmission, a transmission cycle period and subframe offset of a CSI-reference signal (CSI-RS) for performing downlink channel measurement of a receiving object over a relay node Backhaul downlink or a relay node Access downlink, and so on.

Based upon the above-described elements that are to be considered, a periodic transmission timing including a cycle period and a subframe level offset of a basic CSI feedback may be set-up (or determined). Hereinafter, the CSI feedback transmission timing of the relay node and the relay-UE for each of the Backhaul downlink and the Access downlink according to the present invention will be differentiated from one another and described in detail.

Periodic Feedback Method of a Backhaul Uplink CSI Respective to a Backhaul Downlink A characteristic element that is to be considered over a Backhaul link corresponds to the fact that subframes, which cannot be used for the Backhaul downlink transmission, exist among 10 subframes each having the length of 1 ms within a radio subframe having the length of 10 ms. More specifically, in case of the FDD, subframes, to which a Primary Synchronization Signal (PSS), a Secondary Synchronization Signal (SSS), a Primary Broadcast Channel (PBCH), a Paging Channel (PCH), or a Paging Indication Channel (PICH) may be transmitted, cannot be used for the Backhaul downlink transmission. This is because, when the relay node is required to transmit (i.e., perform Access downlink transmission) any of the above-described physical channel and physical signal to user equipments included in the relay zone, in order to perform correct operations of the corresponding user equipments, the relay node may configure settings so that Backhaul downlink transmission cannot be performed in the corresponding subframes.

As described above, in case of the FDD, when a radio subframe is configured of 10 subframes including Subframe #0 to Subframe #9, the subframes that cannot be determined as the Backhaul downlink subframes, due to the transmission of physical channels and physical signals, correspond to Subframes #0/#4/#5/#9 (herein, the PBCH may be located in Subframe #0, the PSS/SSS may be located in Subframes #0 and #5, and the PCH/PICH may be located in Subframes #4 and #9). If flexibility is provided when configuring the subframes, to which the PCH/PICH may be transmitted, Subframe #4 or Subframe #9 or both Subframe #4 and Subframe #9 may be configured as subframes designated to perform relay node Backhaul downlink transmission.

Meanwhile, in case of the TDD, due to the transmission of the PBCH, PSS/SSS, PCH/PICH (herein, the PBCH may be located in Subframe #0, the PSS may be located in Subframes #0 and #6, and the SSS may be located in Subframes #0 and #5), the subframes that cannot be determined as the Backhaul downlink subframes correspond to Subframes #0/#1/#5/#6.

The limitations in the above-described relay node Backhaul downlink configuration influences the timing configuration of the relay node for feeding-back the CSI over the relay node Backhaul link described in the present invention. The CSI feedback is performed by using a CSI-RS transmitted from the base station via downlink. Herein, since the relay node cannot receive the CSI-RS transmitted by the base station in the subframes, which cannot perform Backhaul downlink transmission, a situation where the relay node cannot transmit CSI feedback may occur. Additionally, since the CSI-RS is transmitted at a predetermined cycle period, i.e., a cycle period defined as 5 ms or 10 ms or a predetermined CSI-RS transmission cycle period, which is cell-specifically defined as a plurality multiples of 5 ms or 10 ms over a base station downlink transmission including the Backhaul downlink, instead of being transmitted in each downlink subframe, when a subframe having limitations in being determined as the above-described Backhaul downlink transmission subframe is determined as a CSI-RS transmission subframe, which is cell-specifically configured by the base station, the relay node may not be capable of receiving the CSI-RS. More specifically, the relay node Backhaul downlink configuration may influence both the configuration of Backhaul uplink transmission subframe settings and the settings of a CSI-RS transmission cycle period and subframe offset through a Backhaul downlink, which correspond to factors that are to be considered when configuring the CSI feedback timing of the relay node.

As compared to the above-described relay node Backhaul downlink subframe configuration, the relay node Backhaul uplink subframe configuration may be explicitly configured through an RRC parameter, which is signaled to the relay node, or the relay node Backhaul uplink subframe configuration may be implicitly configured, based upon an HARQ related configuration (most particularly, ACK/NACK RTT (Round Trip Time) settings or a PUSCH transmission timing relation respective to a UL grant, under a situation where the relay node Backhaul downlink transmission subframe is explicitly configured. Eventually, when the configuration of a relay node Backhaul downlink subframe is defined as a single radio frame unit having the length of 10 ms, the configuration of a relay node Backhaul uplink subframe may also be defined as a single radio frame unit having the length of 10 ms, and such configuration may be repeatedly set-up in each radio frame. Meanwhile, when the configuration of the relay node Backhaul downlink subframe is defined as four radio frame units collectively having the length of 40 ms (e.g., when an 8 ms HARQ RTT is applied, or when an 8 ms HARQ RTT and a 10 ms HARQ RTT are applied in combination), the configuration of a relay node Backhaul uplink subframe may also be defined as four radio frame units collectively having the length of 40 ms, and such configuration may be repeatedly set-up in set of four radio frames.

Also, referring to the above-described subframes having limitations in the relay node Backhaul downlink transmission (Subframes #0/#4/#5/#9 in case of the FDD, and Subframes #0/#1/#5/#6 in case of the TDD), it is apparent that the subframes are grouped in pairs with an interval of 5 subframes. For example, in case of the FDD, Subframes #0 and #5 form a pair, and Subframes #4 and #9 form another pair. Also, in case of the TDD, Subframes #0 and #5 form a pair, and Subframes #1 and #6 form another pair.

Based upon the above-described configuration, a cycle period consisting of a multiple of N (N≥1) of the minimum length of 5 ms (a length corresponding to 5 subframes) may be applied as the cycle period according to which the relay node periodically feeds-back the CSI through uplink physical channels PUCCH or PUSCH over the Backhaul uplink.

Also, an offset corresponding to a transmission starting point may be designated as an element for deciding a timing for feeding back the CSI in the relay node over the Backhaul uplink. Herein, such offset may be designated as a subframe-unit offset within a radio frame. Accordingly, based upon the subframes that cannot be designated as the relay node Backhaul downlink transmission subframes (Subframes #0/#4/#5/#9 in case of the FDD, and Subframes #0/#1/#5/#6 in case of the TDD), the positions of the subframes, which are available for CSI feedback timing offset settings, over a Backhaul uplink radio frame may be limited. Hereinafter, the present invention proposes CSI feedback timing offset settings according to detailed embodiments of the present invention.

According to an exemplary embodiment of the present invention, when configuring CSI feedback timing offset settings, in case a strict rule of having to transmit the PUSCH from the $4^{th}$ uplink subframe, after a UL grant PDCCH has been transmitted over the Backhaul link, is being applied, the fact that Subframes #0/#4/#5/#9, in case of the FDD, and Subframes #0/#1/#5/#6, in case of the TDD, within the radio frame, cannot be determined as the relay node Backhaul downlink transmission subframes signifies that the UL grant PDCCH cannot be transmitted through the corresponding downlink subframe. Accordingly, a Backhaul uplink transmission subframe (the $4^{th}$ uplink subframe after the UL grant PDCCH has been transmitted) lacking the PUSCH transmission may exist. More specifically, the relay node Backhaul uplink PUSCH transmission may not be performed in Subframes #3/#4/#8/#9, in case of the FDD, and Subframes #0/#4/#5/#9, in case of the TDD. In this case, although a CSI transmission through the PUCCH in a Backhaul uplink subframe having limitations in performing PUSCH transmission may be considered, based upon a technical point of view, in the aspect of an efficient usage of resource, it is not preferable to determine a Backhaul transmission subframe dedicated only to the PUCCH transmission. Accordingly, the corresponding uplink subframes (Subframes #3/#4/#8/#9, in case of the FDD, and Subframes #0/#4/#5/#9, in case of the TDD) may not be determined as the Backhaul uplink transmission subframe. Accordingly, a CSI information feedback timing offset within a Backhaul uplink radio frame may be limited to only a portion of the subframes, among 10 subframe indexes within one radio frame. More specifically, in case of the FDD, with the exception for Subframes #3/#4/#8/#9, the CSI information feedback timing offset may be determined with respect to the remaining subframe indexes (#0/#1/#2/#5/#6/#7). And, in case of the TDD, with the exception for Subframes #0/#4/#5/#9, the CSI information feedback timing offset may be determined with respect to the remaining subframe indexes (#1/#2/#3/#6/#7/#8).

In the above-described example for configuring (or determining) the CSI feedback timing offset, all of the subframes having limitations in performing Backhaul downlink transmission have been taken into account. However, the present invention will not be limited only to the example given herein. More specifically, as described above, among the subframes having limitations in performing Backhaul downlink transmission, some of the subframes may be used for the Backhaul downlink transmission. For example, as described in the present invention, when Access downlink subframes, which correspond to subframes determined to transmit the PCH or PICH via Access downlink, are determined as Subframe #0 or #5 or as Subframe #0/#5, instead of Subframes #0/#4/#5/#9, as the Base Station Downlink Subframe #4 or #9 or the Base Station Downlink Subframes #4/#9 may be determined as the Backhaul downlink subframes, the CSI feedback offset may be determined in the remaining uplink subframes excluding each of the Backhaul Uplink Subframes #3/#4/#9 or #4/#8/#9 or #4/#9. In this case, among the subframes having limitations in performing uplink PUSCH transmission, some of the subframes may be used for the Backhaul uplink PUSCH transmission. Also, among the subframes having limitations in performing uplink PUSCH transmission, some of the subframes may be determined as Backhaul uplink transmission subframes dedicated to transmit only the PUCCH.

Meanwhile, according to a second exemplary embodiment of the present invention, when configuring CSI feedback timing offset settings, in case a strict rule of having to transmit the PHICH (downlink ACK/NACK) from the $4^{th}$ uplink subframe, after a PUSCH has been transmitted over the Backhaul link, is being applied, the fact that Subframes #0/#4/#5/#9, in case of the FDD, and Subframes #0/#1/#5/#6, in case of the TDD, within one radio frame, cannot be determined as the Backhaul downlink transmission subframes signifies that the PHICH cannot be transmitted through the corresponding downlink subframe. Accordingly, a Backhaul uplink transmission subframe, which is inappropriate for transmitting the PUSCH (from which the ACK/NACK cannot be expected), may exist. More specifically, the Backhaul downlink PHICH transmission cannot be performed in Subframes #0/#1/#5/#6, in case of the FDD, and Subframes #1/#2/#6/#7, in case of the TDD. Accordingly, the corresponding subframe may be determined as the Backhaul PUSCH transmission subframe. In this case, although differently determining the timing relation between the PUSCH and the PHICH may be considered, based upon a technical point of view, in the aspect of an efficient usage of resource, it is not preferable to determine the corresponding subframes as the a Backhaul uplink transmission subframe. Accordingly, the corresponding uplink subframes (Subframes #3/#4/#8/#9, in case of the FDD, and Subframes #0/#4/#5/#9, in case of the TDD) may not be determined as the Backhaul uplink transmission subframe. Accordingly, a CSI feedback timing offset within a Backhaul uplink radio frame may be limited to only a portion of the subframes, among a total of 10 subframe indexes within one radio frame. More specifically, in case of the FDD, with the exception for Subframes #0/#1/#5/#6, the CSI information feedback timing offset may be determined with respect to the remaining subframe indexes (#2/#3/#4/#7/#8/#9). And, in case of the TDD, with the exception for Subframes #1/#2/#6/#7, the CSI information feedback timing offset may be determined with respect to the remaining subframe indexes (#0/#3/#4/#5/#8/#9).

In the above-described example for configuring (or determining) the CSI feedback timing offset, all of the subframes having limitations in performing Backhaul downlink transmission have been taken into account. However, the present invention will not be limited only to the example given herein. More specifically, as described above, among the subframes having limitations in performing Backhaul downlink transmission, some of the subframes may be used for the Backhaul downlink transmission. Therefore, (e.g., when the Backhaul downlink subframes having the PCH/PICH transmitted thereto are flexibly configured), in this case, the PHICH transmission for the Backhaul uplink PUSCH transmission may be performed by using some of the subframes, among the subframes having limitation in performing Backhaul uplink transmission. Accordingly, among the Uplink Subframes #0/#1/#5/#6, in case of the FDD, and, among the Uplink Subframes #1/#2/#6/#7, in case of the TDD, some of the subframes may be used for performing Backhaul uplink PUSCH transmission. As described in the present invention, when Access downlink subframes, which correspond to subframes determined to transmit the PCH or PICH via Access downlink, are determined as Subframe #0 or #5 or as Subframe #0/#5, instead of Subframes #0/#4/#5/#9, as the Base Station Downlink Subframe #4 or #9 or the Base Station Downlink Subframes #4/#9 may be determined as the Backhaul downlink subframes, the CSI feedback offset may be determined in the remaining uplink subframes excluding each of the Backhaul Uplink Subframes #1/#5/#6 or #0/#1/#5 or #1/#5. Also, among the subframes having limitations in performing uplink PUSCH transmission, some of the subframes may be determined as Backhaul uplink transmission subframes dedicated to transmit only the PUCCH.

Also, in the above-described description of the present invention, although the uplink PUSCH transmission has been described, provided that a 4 ms ACK/NACK RTT is being applied, by applying a principle substantially identical to the principle of the above-described present invention, it will be apparent that an uplink subframe that is used for transmitting CSI feedback may also be configured in a case where a 5 ms ACK/NACK RTT timing relation is being applied.

Meanwhile, according to a third exemplary embodiment of the present invention, an example of applying the first example and the second example for configuring CSI feedback timing offset settings at the same time may be considered. More specifically, based upon the subframes that cannot be designates as the Backhaul downlink transmission subframes (Subframes #0/#4/#5/#9, in case of the FDD, and Subframes #0/#1/#5/#6, in case of the TDD), a subframe level offset (starting point) of the CSI feedback timing may be designated based upon both the timing relation between the UL grant PDCCH and PUSCH (first example) and the timing relation between the PUSCH and PHICH (second example). In this case, in case of the FDD, Subframes #2 and #7, which correspond to both Subframes #0/#1/#2/#5/#6/#7 and Subframes #2/#3/#4/#7/#8/#9, may be determined as the subframes used for the Backhaul uplink transmission without any limitation. And, in case of the TDD, Subframes #3 and #8, which correspond to both Subframes #1/#2/#3/#6/#7/#8 and Subframes #0/#3/#4/#5/#8/#9, may be determined as the subframes used for the Backhaul uplink transmission without any limitation. Based upon the 2 subframes corresponding to each case, the subframe level offset (starting point) for determining the CSI information feedback timing via Backhaul uplink may be determined. For example, in case the CSI feedback cycle period is determined as 5 ms, Subframe #2 may be determined as the CSI feedback transmission starting point offset, in case of the FDD, and Subframe #3 may be determined as the CSI feedback transmission starting point offset, in case of the TDD. In another example, in case of the FDD, any one of Subframe #2 and Subframe #7 may be determined as the CSI feedback transmission starting point offset, and, in case of the TDD, any one of Subframe #3 and Subframe #8 may be determined as the CSI feedback transmission starting point offset.

Most particularly, in case of the FDD, as described in the present invention, when Access downlink subframes, which correspond to subframes determined to transmit the PCH or PICH via Access downlink, are determined as Subframe #0 or #5 or as Subframe #0/#5, instead of Subframes #0/#4/#5/#9, and as the Base Station Downlink Subframe #4 or #9 or the Base Station Downlink Subframes #4/#9 may be determined as the Backhaul downlink subframes, with respect to each case, the subframes corresponding to both Subframes #0/#1/#2/#5/#6/#7/#8 or #0/#1/#2/#3/#5/#6/#7 or #0/#1/#2/#3/#5/#6/#7/#8 of the first example, and Subframes #0/#2/#3/#4/#7/#8/#9 or #2/#3/#4/#6/#7/#8/#9 or #0/#2/#3/#4/#6/#7/#8/#9 may be determined as the CSI feedback offset. Accordingly, with respect to each case where additional configurations may be made on the above-described Backhaul downlink subframe, Subframes #0/#2/#7/#8 or #2/#3/#6/#7 or #0/#2/#3/#6/#7/#8 may be determined as the uplink subframes to which a subframe offset of the CSI feedback timing can be determined.

Meanwhile, in case of the TDD, while varying the ACK/NACK RTT depending upon the downlink/uplink (DL/UL) subframe configuration ratio or type, multiple ACK/NACK RTTs (ACK/NACK RTT bundling) within a random subframe may be considered. In this case, in accordance with the property of a DL/UL subframe essentially being multiplexed by using the TDM method, the Backhaul uplink Subframe #3 and Subframe #8, which are configured as described above, may not be valid to be determined as the CSI feedback transmission starting point. In this case, based upon the degree of freedom in determining the ACK/NACK RTT, and based upon a distribution status within a radio frame of a DL/UL subframe, a subframe that can transmit the CSI feedback should be randomly determined. Herein, at this point, it is preferable that the minimum CSI feedback cycle period is set to 10 ms or 20 ms, and the CSI feedback cycle period of the relay node may be determined as a multiple of the corresponding minimum CSO feedback cycle period (wherein the multiple corresponds to a multiple of an integer).

In the above-described description of the present invention, as part of the periodic feedback configuration (feedback transmission starting point (offset) and feedback period configuration), the present invention consider subframes from which a Backhaul uplink transmission subframe can be determined. Alternatively, unlike the configuration of a relay Backhaul uplink transmission subframe, which is either explicitly signaled or implicitly configured, the relay node may be defined to feedback CSI through the PUCCH or PUSCH, only when a periodic feedback configuration (offset and cycle period) of the corresponding CSI, which is respective to a Backhaul downlink channel, is determined, and when a Backhaul uplink transmission subframe is determined at a time period (subframe), during which the relay node feedsback the CSI based upon such configuration. Accordingly, a lowest common multiple between the Backhaul uplink transmission subframe configuration pattern and the periodic feedback configuration of a CSI respective to the Backhaul downlink channel is validly set-up as the CSI feedback cycle period value. Thereafter, an exact CSI feedback pattern may be defined as the corresponding lowest common multiple section unit.

Access Uplink CSI Periodic Feedback Method Respective to an Access Uplink

The Characteristic elements that should be considered in an Access link are as follows.

As Backhaul uplink transmission subframes are configured by using a periodic pattern consisting of one radio frame (a length of 10 ms) or 4 radio frames (a length of 40 ms), in subframe indexes, wherein Backhaul uplink transmission subframes are configured, a full blanking effect may occur in an Access uplink subframe (i.e., the Access uplink subframe may be fully blanked). When an Access uplink subframe is fully blanked in subframe indexes that are configured in order to perform Backhaul uplink transmission, this signifies that the entire corresponding uplink subframe cannot be used for the Access uplink transmission. As described above, the configuration of a Backhaul uplink transmission subframe may either be explicitly configured in a higher-layer configuration by the base station (or cell) or be implicitly configured based upon an explicit configuration of a Backhaul downlink subframe.

As described above, when a Backhaul uplink is implicitly configured based upon the fact that, in case of the FDD, all of or only a portion of downlink subframe indexes #0/#4/#5/#9, and, in case of the TDD, all of or only a portion of downlink subframe indexes #0/#1/#5/#6 cannot be assigned as a subframe designated for Backhaul downlink transmission, accordingly, it may be ensured that the remaining uplink subframes are not determined (or set-up) as Backhaul uplink, i.e., it may be ensured that the remaining uplink subframes are defined as Access uplink subframes.

Conversely, when a specific method for setting-up a Backhaul uplink transmission subframe in order to determine an effective transmission subframe within an Access/Backhaul downlink/uplink (e.g., when a Backhaul uplink transmission subframe is set-up without considering the limitations in the Backhaul downlink subframe), accordingly, it may be ensured that the remaining uplink subframes are not determined (or set-up) as Backhaul uplink, i.e., it may be ensured that the remaining uplink subframes are defined as Access uplink subframes. For example, provided that the subframes are configured of 8 ms HARQ RTT and/or 4 ms HARQ RTT, for the purpose of uniformly setting up subframe transmission resources within an Access link and a Backhaul link, a Backhaul uplink subframe may be determined to be set-up only in even-numbered (or odd-numbered) subframe indexes within a single radio frame. Accordingly, the odd-numbered (or even-numbered) subframes of the corresponding radio frame may be naturally determined as Access uplink transmission subframes.

Hereinafter, based upon the above-described details, in setting up CSI periodic feedback configuration (transmission starting point (offset) and transmission cycle period) of user equipments (i.e., relay-UEs) within a relay zone, the present invention proposes the following exemplary methods in detail.

First of all, as Method 1, by using a periodic pattern of 10 ms or 40 ms units of a subframe, which may always be determined as an Access uplink subframe, a periodic pattern (which is configured by designating a cycle period value and an offset (starting point) of a subframe level) of a CSI feedback respective to an Access downlink channel of a relay-UE may be set-up. The following exemplary embodiments may be applied to Method 1 according to the present invention.

Embodiment 1 of Method 1 is based upon the first example of the periodic Backhaul uplink CSI feedback method of a relay station with respective to the above described 'Backhaul downlink.

For example, in an FDD system, due to the fact that the downlink subframe indexes #0/#4/#5/#9 cannot be set-up as Backhaul downlink transmission subframes, when the base station cannot transmit a UL grant PUCCH for performing uplink transmission of the relay node through the corresponding downlink subframe, a case of applying a method of not determining uplink subframes #3/#4/#8/#9 as Backhaul uplink transmission subframes may be considered herein. In this case, the corresponding uplink subframes #3/#4/#8/#9 become subframes that are available to be set up for the Access uplink transmission of the relay-UE. In order to do so, in configuring a CSI periodic feedback respective to the relay-UE, the CSI feedback cycle period may be set-up to have a minimum cycle period of 5 ms and may be set up to have a cycle period corresponding to a positive integer multiple of 5 ms or 10 ms depending upon the higher-layer structure. And, any subframe among subframes #3/#4/#8/#9 within a radio subframe may be randomly determined as a CSI feedback starting point (offset). For example, as described above, in the present invention, when Access downlink subframes, which correspond to subframes determined to transmit the PCH or PICH via Access downlink, are determined as Subframe #0 or #5 or as Subframe #0/#5, instead of Subframes #0/#4/#5/#9, as the Base Station Downlink Subframe #4 or #9 or the Base Station Downlink Subframes #4/#9 may be determined as the Backhaul downlink subframes, the Access uplink CSI feedback offset may be determined as a random subframe among the Access uplink Subframes #3/#4/#9 or #4/#8/#9 or #4/#9.

Similarly, in case of a TDD system, due to the fact that the downlink subframe indexes #0/#1/#5/#6 cannot be applied for Backhaul downlink transmission, when the base station cannot transmit a UL grant PUCCH for performing uplink transmission of the relay node through the corresponding downlink subframe, a case of not setting-up uplink subframes #0/#4/#5/#9 for the Backhaul uplink transmission may be considered herein. In this case, the corresponding uplink subframes #0/#4/#5/#9 become subframes that are available to be set up for the Access uplink transmission of the relay-UE. In order to do so, in configuring a CSI periodic feedback respective to the relay-UE, the CSI feedback cycle period may be set-up to have a minimum cycle period of 5 ms and may be set up to have a cycle period corresponding to a positive integer multiple of 5 ms or 10 ms depending upon the higher-layer structure. And, any subframe among subframes #0/#4/#5/#9 within a radio subframe may be randomly determined as a CSI feedback starting point (offset).

Additionally, in case of the TDD, unlike in the case of the FDD, a case where a portion of Access uplink subframes #0/#4/#5/#9 cannot be set up as the uplink transmission subframe, based upon a DL/UL subframe configuration ratio or subframe type, should be further considered. For example, when the corresponding subframe is designated as a DL subframe or corresponds to a special subframe (a subframe including 3 fields of a DwPTS (Downlink Pilot Time Slot), a GP (Gap Period), and a UpTPS (Uplink Pilot Time Slot)), the corresponding subframe cannot be set-up as an Access uplink transmission subframe. In this case, when configuring the CSI periodic feedback of the corresponding relay-UE, among the uplink subframes #0/#4/#5/#9, an offset value may be determined among the remaining subframes excluding at least one or more subframes, which cannot be set up as the Access uplink transmission subframe. In a situation where a portion of the uplink subframes #0/#4/#5/#9 cannot be determined as uplink transmission subframes with respect to each given offset value, an offset that cannot be determined to have a cycle period value or a minimum available value of 5 ms may be generated. In this case, the cycle period value or the minimum available cycle period value may be set to a value greater than 5 ms.

Meanwhile, Embodiment 2 of Method 1 is based upon the second example of the periodic Backhaul uplink CSI feedback method of a relay station with respective to the above described 'Backhaul downlink.

For example, in an FDD system, due to the fact that the downlink subframe indexes #0/#4/#5/#9 cannot be applied to Backhaul downlink transmission, when the base station cannot transmit a downlink ACK/NACK (PHICH) with respect to an uplink PUSCH transmission of a relay node through the corresponding downlink subframe, a case of not setting up uplink subframes #0/#1/#5/#6 for Backhaul uplink transmission may be considered herein. In this case, the corresponding uplink subframes #0/#1/#5/#6 become subframes that are available to be set up for the Access uplink transmission of the relay-UE. In order to do so, in configuring a CSI periodic feedback respective to the relay-UE, the CSI feedback cycle period value may be set-up to have a minimum cycle period of 5 ms and may be set up to have a cycle period corresponding to a positive integer multiple of 5 ms depending upon the higher-layer structure. And, the CSI feedback starting point (offset) may have a random value among subframes #0/#1/#5/#6 within a radio subframe. For example, as described above, in the present invention, when Access downlink subframes, which correspond to subframes determined to transmit the PCH or PICH via Access downlink, are determined as Subframe #0 or #5 or as Subframe #0/#5, instead of Subframes #0/#4/#5/#9, as the Base Station Downlink Subframe #4 or #9 or the Base Station Downlink Subframes #4/#9 may be determined as the Backhaul downlink subframes, the Access uplink CSI feedback offset may be determined as a random subframe among the Access uplink Subframes #1/#5/#6 or #0/#1/#5 or #1/#5.

Similarly, in case of a TDD system, due to the fact that the downlink subframe indexes #0/#1/#5/#6 cannot be applied for Backhaul downlink transmission, when the base station cannot transmit a downlink ACK/NACK (PHICH) with respect to an uplink PUSCH transmission of a relay node through the corresponding downlink subframe, a case of not setting-up uplink subframes #1/#2/#6/#7 for the relay Backhaul uplink transmission may be considered herein. In this case, the corresponding uplink subframes #1/#2/#6/#7 become subframes that are available to be set up for the Access uplink transmission of the relay-UE. In order to do so, in configuring a CSI periodic feedback respective to the relay-UE, the CSI feedback cycle period may be set-up to have a minimum cycle period of 5 ms and may be set up to have a cycle period corresponding to a positive integer multiple of 5 ms depending upon the higher-layer structure. And, any subframe among subframes #0/#4/#5/#9 within a radio subframe may be randomly determined as a CSI feedback starting point (offset).

Additionally, in case of the TDD, unlike in the case of the FDD, a case where a portion of uplink subframes #1/#2/#6/#7 cannot be set up as the uplink transmission subframe, based upon a DL/UL subframe configuration ratio or subframe type (a case where the corresponding subframe is designated as a DL subframe or corresponds to a special subframe), should be further considered. In this case, when configuring the CSI periodic feedback of the corresponding relay-UE, among the uplink subframes #1/#2/#6/#7, an offset value may be determined among the remaining subframes excluding at least one or more subframes, which cannot be set up as the Access uplink transmission subframe. In a situation where a portion of the uplink subframes #1/#2/#6/#7 cannot be determined as uplink transmission subframes with respect to each given offset value, an offset that cannot be determined to have a cycle period value of 5 ms may be generated. In this case, the cycle period value may be set to a value greater than 5 ms.

Also, in the above-described description of the present invention, although the uplink PUSCH transmission has been described, provided that a 4 ms ACK/NACK RTT is being applied, by applying a principle substantially identical to the principle of the above-described present invention, it will be apparent that an uplink subframe that is used for transmitting CSI feedback may also be configured in a case where a 5 ms ACK/NACK RTT timing relation is being applied.

Meanwhile, Embodiment 3 of Method 1 is based upon both the first example and the second example of Method 1.

For example, in an FDD system, due to the fact that the downlink subframe indexes #0/#4/#5/#9 cannot be applied to a Backhaul downlink transmission, a case where the base station cannot transmit a UL grant PUCCH for performing uplink transmission of the relay node through the corresponding downlink subframe (Embodiment 1), and a case where the base station cannot transmit a downlink ACK/NACK (PHICH) with respect to an uplink PUSCH transmission of a relay node through the corresponding downlink subframe, are both considered herein. In this case, in case of the FDD system, as described above in the present invention, when an Access downlink subframe, to which transmission of the PCH or PICH via Access downlink is determined, is set up as subframe #0 or #5 or subframes #0/#5, instead of subframe #0/#4/#5/#9, as base station downlink subframe #4 or #9 or base station downlink subframes #4/#9 may be set up as the Backhaul downlink subframes, a method of configuring a subframe offset of an Access uplink CSI feedback timing by using subframes corresponding to all of subframes #3/#4/#9 or #4/#8/#9 or #4/#9 with respect to each case described in Embodiment 1 of Method 1 and to all of subframes #1/#5/#6 or #0/#1/#5 or #1/#5 with respect to each case described in Embodiment 2 of Method 1 may be considered herein. However, with respect to each case where the above-described Backhaul downlink subframe can be additionally configured, there may occur a situation where downlink subframes, which may determine subframe offset of an Access uplink CSI feedback timing available in Embodiment 1 of Method 1 and in Embodiment 2 of Method 2. In this situation, Method 2 that will be proposed hereinafter may be applied, so as to determine a subframe offset of the Access uplink CSI feedback timing.

Similarly, in case of the TDD, with respect to the remaining subframes within a single radio frame excluding uplink subframes #3 and #8, the CSI periodic feedback of a relay-UE having a random cycle period and subframe level offset (starting point) may be defined. Additionally, in case of the TDD, unlike in the case of the FDD, a situation where a portion of the remaining uplink subframes, excluding uplink subframes #3 and #8, cannot be set up as the Access uplink transmission subframe, based upon a DL/UL subframe configuration ratio or subframe type (a case where the corresponding subframe is designated as a DL subframe or corresponds to a special subframe), may occur. In this case, when configuring a periodic feedback of the CSI control information of a user equipment within the corresponding relay zone, among the uplink subframes in which an offset value may be determined, the offset value may be determined from any one of the remaining subframes excluding at least one or more subframes, which cannot be determined as the Access uplink transmission subframe. In a situation where any one of the uplink subframes #3 and #8 cannot be determined as uplink transmission subframes with respect to each given offset value, an offset that cannot be determined to have a cycle period value of 5 ms may be generated. In this case, the cycle period value may be set to a value greater than 5 ms.

Also, in the above-described description of the present invention, although the uplink PUSCH transmission has been described, provided that a 4 ms ACK/NACK RTT is being applied, by applying a principle substantially identical to the principle of the above-described present invention, it will be apparent that an uplink subframe that is used for transmitting CSI feedback may also be configured in a case where a 5 ms ACK/NACK RTT timing relation is being applied.

Meanwhile, Embodiment 4 of Method 1 corresponds to a method for drawing out a maximum throughput based upon transmission subframe settings, in an aspect of uniformly assigning transmission resources between an Access link and a Backhaul link. Herein, uplink subframes that can be set up for the Backhaul uplink transmission may be configured of even-numbered (or odd-numbered) subframes within a random radio frame. And, accordingly, uplink subframe that can be set up for the Access uplink transmission may be configured of odd-numbered (or even-numbered) subframes within a random radio frame. At this point, when configuring a CSI periodic feedback of a relay-UE respective to an Access downlink channel, the cycle period value may be determined as a multiple of 2, and a subframe level offset may be configured to have a value of any one of #1/#3/#5/#7/#9 (or #0/#2/#4/#6/#8) within a random radio frame.

Additionally, in case of the TDD, unlike in the case of the FDD, a case where a portion of odd-numbered (or even-numbered) subframes, which can be determined as an Access uplink subframe in a random radio frame, based upon a DL/UL subframe configuration ratio or subframe type (a case where the corresponding subframe is designated as a DL subframe or corresponds to a special subframe), should be more particularly further considered. In this case, when setting up a cycle period value of a CSI periodic feedback configuration and an offset value of a subframe level of the corresponding relay-UE, a configuration method that does not determine the CSI feedback timing with subframes that cannot be determined to perform Access uplink transmission. Conversely, a method of configuring a CSI periodic feedback regardless of the presence of subframes that cannot be determined to perform Access uplink transmission, and, when the corresponding subframe corresponds to a subframe that cannot be determined to perform Access uplink transmission during the CSI feedback transmission timing, a method of abandoning (or not performing) CSI feedback at the corresponding subframe timing may also be applied herein (this may also be defined as a predetermined CSI puncturing process).

Meanwhile, Method 2 of the present invention related to the Access uplink CSI periodic feedback of the relay-UE will now be described in detail.

According to Method 2, the Access uplink CSI periodic feedback configuration (cycle period value and subframe level offset) of the relay-UE is configured in disrespect to the 10 ms or 40 ms unit configuration of the Access uplink transmission subframe, which is configured in connection with the Backhaul uplink transmission subframe configuration, i.e., independently configured, and it may be defined that the user equipment feeds-back the corresponding CSI through the PUCCH or PUSCH only when the Backhaul uplink subframe is configured at a timing for the CSI feedback of the corresponding relay-UE. Accordingly, the lowest common multiple between the Access uplink transmission subframe configuration pattern and the periodic feedback configuration pattern of the CSI respective to the Access downlink channel may be configured as the CSI feedback cycle period value, and an exact CSI feedback pattern may be defined as the corresponding lowest common multiple section unit.

Figure 16:
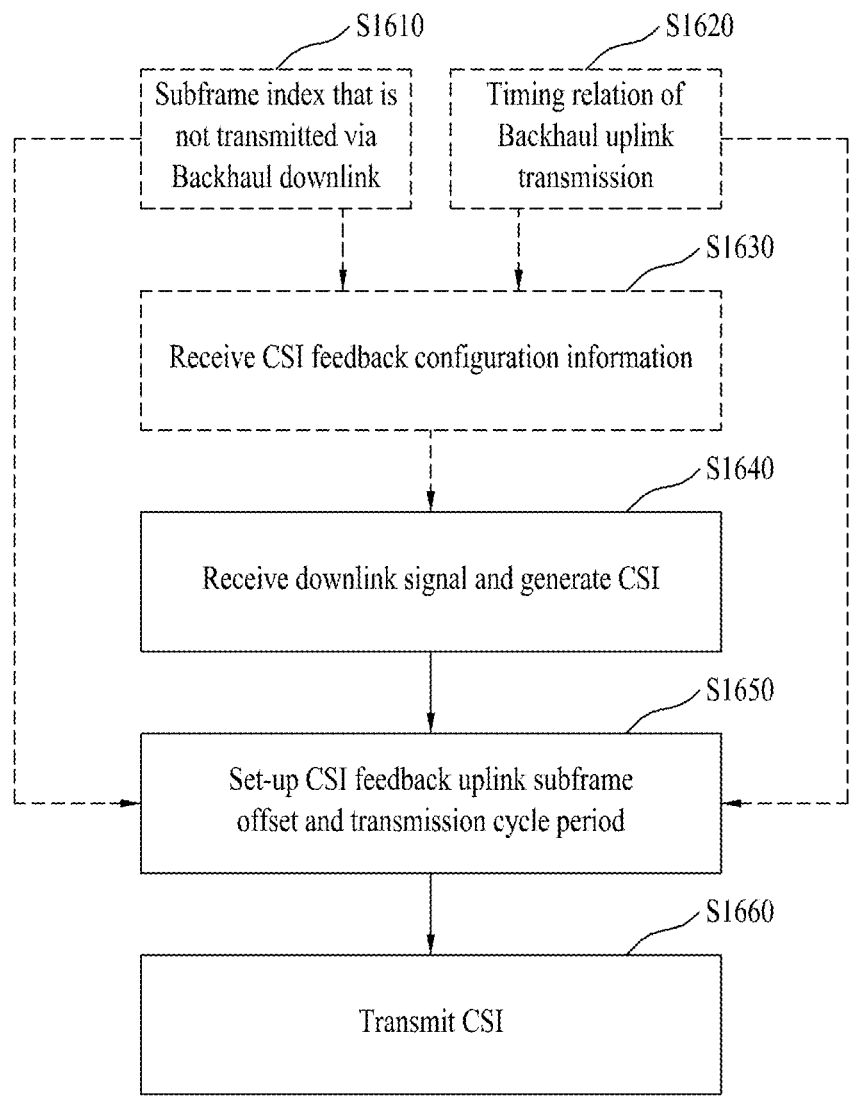
FIG. 16 illustrates a flow chart showing the process steps of a CSI transmission method according to the present invention.

FIG. 16 illustrates a flow chart showing the process steps of a CSI transmission method according to the present invention.

In step S1610, a subframe (at least one or more of subframe indexes #0, #4, #5, and #9, in case of an FDD system, and at least one or more of subframe indexes #0, #1, #5, and #6, in case of an TDD system), which cannot be used for Backhaul downlink transmission, may be decided.

In step S1620, the Backhaul uplink transmission timing relation may be decided. Herein, the Backhaul uplink transmission timing relation may include at least one or more of a timing relation between a Backhaul uplink grant (UL grant) and a Backhaul uplink data (PUSCH) transmission, and a timing relation between a Backhaul uplink data (PUSCH) transmission and a Backhaul downlink acknowledgement response (PHICH).

In step S1630, based upon the result of step S1610 and step S1620, configuration information on a Backhaul uplink subframe index, from which the CSI respective to the Backhaul downlink channel can be transmitted, and the CSI transmission cycle period may be received. More specifically, information on the settings for the starting point (offset) and transmission cycle period of the CSI feedback via Backhaul uplink may be received. Additionally, information on the settings for a frequency resource through which the CSI is transmitted, a code resource, a modulation order, a coding rate, and an MIMO transmission method may also be received.

Although the descriptions of the above-described steps S1610, S1620, and S1630 are mainly based on the relay node receiving the information set-up by the base station, according to an exemplary embodiment of the present invention, the relay node itself may decide the CSI feedback settings from pre-defined details. More specifically, as shown in FIG. 16 with respect to step S1650, the information of step S1610 and S1620 may be given in advance to the relay node as pre-defined details, and the relay node itself may set-up the CSI feedback offset and cycle period from such information.

In step S1640, a Backhaul downlink signal (data and pilot signal) may be received, and a CSI respective to a Backhaul downlink channel may be generated based upon the received Backhaul downlink signal. As described above, in step S1650, the relay node may decide an offset and cycle period for the CSI feedback transmission. In step S1660, the CSI, which is generated in step S1640, may be transmitted via Backhaul uplink in accordance with the setting on the CSI feedback transmission, which is determined in step S1650.

Meanwhile, the description of FIG. 16 may also be identically applied to a case where the relay-UE feeds-back the CSI respective to the Access downlink channel to the relay node.

Steps S1610 and S1620 are performed by the relay node, and the configuration information on the CSI feedback transmission, which is transmitted via Access uplink in Step 1630, may be provided to the relay-UE. Additionally, in some cases, steps S1610 to S1630 may not be performed, and, as described in step S1650, the relay node itself may set-up the offset and cycle period respective to the CSI transmission based upon the pre-defined information.

In step S1640, an Access downlink signal (data and pilot signal) may be received, and a CSI respective to an Access downlink channel may be generated based upon the received Access downlink signal. In step S1660, the CSI, which is generated in step S1640, may be transmitted via Access uplink in accordance with the setting on the CSI feedback transmission, which is determined in step S1650.

Although the method for configuring CSI feedback and the method for transmitting the CSI feedback are briefly described with reference to FIG. 16, for the clarity in the description of the present invention, it will be apparent that the description of diverse exemplary embodiments of the present invention may be applied as the details of the above-described methods.

Figure 17:
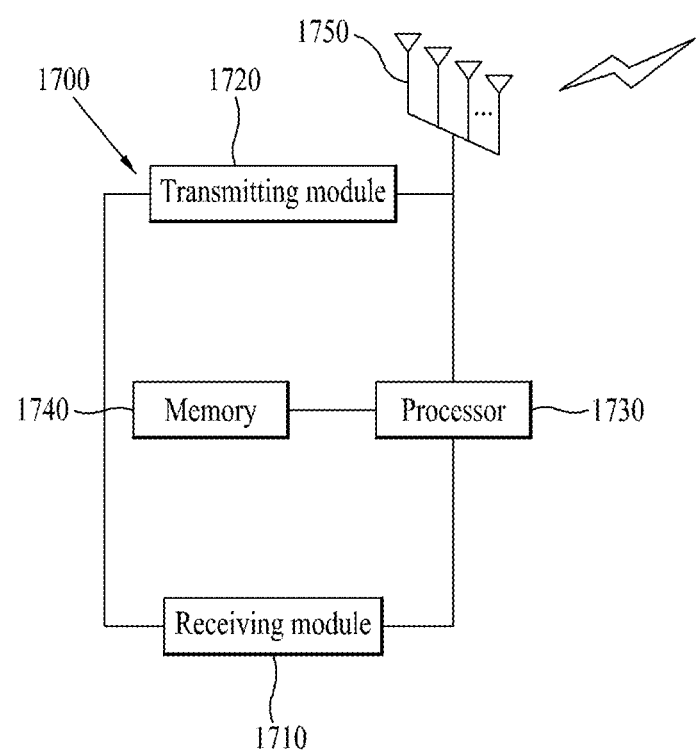
FIG. 17 illustrates structures of a relay node device, a user equipment device, and a base station device according to a preferred embodiment of the present invention.

FIG. 17 illustrates structures of a relay node device, a user equipment device, and a base station device according to a preferred embodiment of the present invention.

Referring to FIG. 17, the relay node device (1700) according to the present invention may include a receiving module (1710), a transmitting module (1720), a processor (1730), a memory (1740), and multiple antennae (1750). Herein, the multiple antennae signify a relay node that supports MIMO transmission and reception.

The receiving module (1710) may receive various types of signals, data, and information within a Backhaul downlink from the base station, and the receiving module (1710) may also receive various types of signals, data, and information within an Access uplink from the user equipment. The transmitting module (1720) may transmit various types of signals, data, and information within a Backhaul downlink to the base station, and the transmitting module (1720) may also transmit various types of signals, data, and information within an Access uplink to the user equipment. The processor (1730) may be configured to control the overall operations of the relay node (1700).

According to an exemplary embodiment of the present invention, the processor (1730) of the relay node device may be configured to generate channel status information (CSI) based upon the received Backhaul downlink signal and to transmit the channel status information through a Backhaul uplink subframe. The Backhaul uplink subframe through which the channel status information is transmitted may be decided based upon a relation between a subframe index, to which the Backhaul downlink subframe is not designated, and a Backhaul uplink transmission timing. Herein, the Backhaul uplink transmission timing relation may be based on at least one or more of the timing relation between a Backhaul uplink grant and a Backhaul uplink data transmission and the timing relation between a Backhaul uplink data transmission and a Backhaul downlink acknowledgement response.

Furthermore, the Backhaul uplink subframe from which the channel status information is transmitted may be set-up as the starting point for cyclic transmission of the channel status information. The information on the Backhaul uplink subframe, from which the channel status information is transmitted, and information on the cycle period for the channel status information transmission may be notified through higher-layer scheduling or L1/L2 control signaling, which is transmitted from the base station.

Additionally, the processor (1730) of the relay node device may perform functions of operating and processing information received by the relay node, information that is to be transmitted outside the system, and so on. Furthermore, the memory (1740) may store the operated and processed information for a predetermined period of time. Herein, the memory (1740) may also be replaced by other components such as a buffer (not shown).

Meanwhile, referring to FIG. 17, the user equipment device (1700) according to the present invention may include a receiving module (1710), a transmitting module (1720), a processor (1730), a memory (1740), and multiple antennae (1750). Herein, the multiple antennae signify a user equipment device that supports MIMO transmission and reception.

The receiving module (1710) may receive various types of signals, data, and information within a downlink (or Access downlink) from the base station (or relay node). The transmitting module (1720) may transmit various types of signals, data, and information within an uplink (or Access uplink) to the base station (or relay node). The processor (1730) may be configured to control the overall operations of the user equipment device (1700).

The processor (1730) of the user equipment device may be configured to generate channel status information (CSI) based upon an Access downlink signal and to transmit the channel status information through an Access uplink subframe. The Access uplink subframe through which the channel status information is transmitted may be decided based upon a relation between a subframe index, to which the Backhaul downlink subframe is not designated, and a Backhaul uplink transmission timing. Herein, the Backhaul uplink transmission timing relation may be based on at least one or more of the timing relation between a Backhaul uplink grant and a Backhaul uplink data transmission and the timing relation between a Backhaul uplink data transmission and a Backhaul downlink acknowledgement response.

Furthermore, the Access uplink subframe from which the channel status information is transmitted may be set-up as the starting point for cyclic transmission of the channel status information. The information on the Access uplink subframe, from which the channel status information is transmitted, and information on the cycle period for the channel status information transmission may be notified through higher-layer scheduling or L1/L2 control signaling, which is transmitted from the base station (or relay node).

Additionally, the processor (1730) of the user equipment device may perform functions of operating and processing information received by the relay node, information that is to be transmitted outside the system, and so on. Furthermore, the memory (1740) may store the operated and processed information for a predetermined period of time. Herein, the memory (1740) may also be replaced by other components such as a buffer (not shown).

Meanwhile, referring to FIG. 17, the base station device (1700) according to the present invention may include a receiving module (1710), a transmitting module (1720), a processor (1730), a memory (1740), and multiple antennae (1750). Herein, the multiple antennae signify a base station that supports MIMO transmission and reception.

The receiving module (1710) may receive various types of signals, data, and information within an uplink (or Backhaul uplink) from the user equipment (or relay node). The transmitting module (1720) may transmit various types of signals, data, and information within a downlink (or Backhaul downlink) to the user equipment (or relay node). The processor (1730) may be configured to control the overall operations of the base station device (1700).

The base station device may direct the relay node to feedback CSI respective to the Backhaul downlink channel via Backhaul uplink. Accordingly, the base station device may provide configuration information on the CSI feedback (CSI feedback cycle period, offset, and so on) to the relay node.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, microprocessors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be applied in diverse types of wireless mobile communication systems.

What is claimed is:

1. A method for transmitting channel status information at a relay node, the method comprising:
   receiving, by the relay node from a base station, a Backhaul downlink signal including a pilot signal;
   performing, by the relay node, a channel estimation for a Backhaul downlink channel based upon the pilot signal included in the Backhaul downlink signal;
   generating, by the relay node, channel status information based upon the channel estimation, wherein the channel status information includes at least one of rank information, precoding information, or channel quality information; and transmitting, by the relay node, the channel status information through a Backhaul uplink subframe, wherein the Backhaul uplink subframe through which the channel status information is transmitted is decided based upon a subframe index to which a Backhaul downlink subframe is not designated and a Backhaul uplink transmission timing relation, wherein the channel status information is periodically transmitted from a channel status information periodic transmission starting point, and wherein the Backhaul uplink transmission timing relation corresponds to at least one of a timing relation between a Backhaul uplink grant and a Backhaul uplink data transmission or a timing relation between the Backhaul uplink data transmission and a Backhaul downlink acknowledgement response.

2. The method of claim 1, wherein the Backhaul uplink subframe through which the channel status information is transmitted is a subframe out of a set including subframe indexes #0, #1, #2, #5, #6, and #7 when the relay node is in an FDD (Frequency Division Duplex) mode, and is a subframe out of a set including subframe indexes #1, #2, #3, #6, #7, and #8 when the relay node is in a TDD (Time Division Duplex) mode.

3. The method of claim 2, further comprising:
receiving, by the relay node from a user equipment, user equipment channel status information via a subframe out of a set including one of subframe indexes #3, #4, #8, and #9 when the relay node is in an FDD mode, and via a subframe out of a set including one of subframe indexes #0, #4, #5, and #9 when the relay node is in a TDD mode.

4. The method of claim 1, wherein the Backhaul uplink subframe through which the channel status information is transmitted is a subframe out of a set including subframe indexes #2, #3, #4, #7, #8, and #9 when the relay node is in an FDD mode, and is a subframe out of a set including subframe indexes #0, #3, #4, #5, #8, and #9 when the relay node is in a TDD mode.

5. The method of claim 4, further comprising:
receiving, by the relay node from a user equipment, user equipment channel status information via a subframe out of a set including one of subframe indexes #0, #1, #5, and #6 when the relay node is in an FDD mode, and via a subframe out of a set including one of subframe indexes #1, #2, #6, and #7 when the relay node is in a TDD mode.

6. The method of claim 1, wherein the subframe index to which the Backhaul downlink subframe is not designated corresponds to at least one of subframe indexes #0, #4, #5, and #9 when the relay node is in an FDD mode, and corresponds to at least one of subframe indexes #0, #1, #5, and #6 when the relay node is in a TDD mode.

7. The method of claim 1,
wherein the Backhaul uplink transmission timing relation includes the timing relation between the Backhaul uplink grant and the Backhaul uplink data transmission and the timing relation between the Backhaul uplink data transmission and the Backhaul downlink acknowledgement response, and wherein the Backhaul uplink subframe through which the channel status information is transmitted is a subframe out of a set including subframe indexes #2 and #7 when the relay node is in an FDD mode, and is a subframe out of a set including subframe indexes #3 and #8 when the relay node is in a TDD mode.

8. The method of claim 1, wherein the Backhaul uplink subframe through which the channel status information is transmitted is the channel status information periodic transmission starting point.

9. The method of claim 1, wherein information on the Backhaul uplink subframe through which the channel status information is transmitted and information on a period of the periodically transmitted channel status information are notified through higher-layer signaling or L1/L2 control signaling from the base station.

10. The method of claim 1, wherein a periodicity for the channel status information transmission is a lowest common multiple between a periodicity of Backhaul uplink subframes transmitted by the relay node and a periodicity of the periodically transmitted channel status information.

11. The method of claim 1, a periodicity for the channel status information transmission is a multiple of N (N≥1) of 5 subframes, where N is an integer.

12. A relay node configured to transmit channel status information and comprising:
a receiving circuit configured to receive a Backhaul downlink signal from a base station and to receive an Access uplink signal from a user equipment;
a transmitting circuit configured to transmit a Backhaul uplink signal to the base station and to transmit an Access downlink signal to the user equipment; and
a processor configured to control the receiving circuit and the transmitting circuit,
wherein the Backhaul downlink signal includes a pilot signal,
wherein the processor is configured to:
perform a channel estimation for a Backhaul downlink channel based upon the pilot signal included in the Backhaul downlink signal,
generate channel status information based upon the channel estimation,
wherein the channel status information includes at least one of rank information, precoding information, or channel quality information, and
transmit the channel status information through a Backhaul uplink subframe through the transmitting circuit, and
wherein a Backhaul uplink subframe through which the channel status information is transmitted is decided based upon a timing relation between a subframe index to which a Backhaul downlink subframe is not designated and Backhaul uplink transmission,
wherein the channel status information is periodically transmitted from a channel status information periodic transmission starting point, and
wherein the Backhaul uplink transmission timing relation corresponds to at least one of a timing relation between a Backhaul uplink grant and a Backhaul uplink data transmission or a timing relation between the Backhaul uplink data transmission and a Backhaul downlink acknowledgement response.

* * * * *